US011323582B2

(12) United States Patent
Ikeda et al.

(10) Patent No.: US 11,323,582 B2
(45) Date of Patent: May 3, 2022

(54) IMAGE READING APPARATUS CAPABLE OF READING AND DISPLAYING IMAGE OF DOCUMENT PLACED ON PLATEN

(71) Applicant: FUJIFILM Business Innovation Corp., Tokyo (JP)

(72) Inventors: Eriko Ikeda, Kanagawa (JP); Xiaojing Zhang, Kanagawa (JP); Hiroo Seki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 337 days.

(21) Appl. No.: 16/181,359

(22) Filed: Nov. 6, 2018

(65) Prior Publication Data

US 2019/0149680 A1    May 16, 2019

(30) Foreign Application Priority Data

Nov. 15, 2017    (JP) .............................. JP2017-219917

(51) Int. Cl.
*G06F 3/12* (2006.01)
*H04N 1/00* (2006.01)
*H04N 1/387* (2006.01)

(52) U.S. Cl.
CPC ......... *H04N 1/00824* (2013.01); *H04N 1/387* (2013.01)

(58) Field of Classification Search
CPC .......................... H04N 1/00824; H04N 1/387
USPC ......................................... 358/1.1–1.18, 474
See application file for complete search history.

(56) References Cited

U.S. PATENT DOCUMENTS

| 6,345,763 B1 | 2/2002 | Matsuda et al. |
| 7,626,726 B2 | 12/2009 | Chiba |
| 8,553,276 B2 | 10/2013 | Kohara et al. |
| 8,767,273 B2 | 7/2014 | Kanaya |
| 8,780,407 B2 | 7/2014 | Morimoto et al. |
| 8,854,661 B2 | 10/2014 | Saito |
| 2004/0070689 A1* | 4/2004 | Mochizuki ......... H04N 1/00291 348/552 |
| 2006/0119902 A1* | 6/2006 | Ahmed ................ H04N 1/3872 358/474 |
| 2015/0116788 A1* | 4/2015 | Oshima .............. H04N 1/19594 358/451 |
| 2015/0262034 A1* | 9/2015 | Hayakawa ............. G06K 9/342 382/195 |

(Continued)

FOREIGN PATENT DOCUMENTS

| CN | 1848905 | 10/2006 |
| CN | 101873403 | 10/2010 |
| CN | 102665021 | 9/2012 |

(Continued)

OTHER PUBLICATIONS

"Office Action of Japan Counterpart Application", dated Jun. 15, 2021, with English translation thereof, p. 1-p. 6.

(Continued)

*Primary Examiner* — Gabriel I Garcia
(74) *Attorney, Agent, or Firm* — JCIPRNET

(57) ABSTRACT

An image reading apparatus includes: a reading unit that reads an image of a document placed on a platen for placing documents; and a display unit that displays part of the image of the document read by the reading unit in a range adjacent to a range, in which the document is placed, of the platen.

6 Claims, 23 Drawing Sheets

(56) References Cited

U.S. PATENT DOCUMENTS

2017/0195519 A1* 7/2017 Mishima ............ H04N 1/00809

FOREIGN PATENT DOCUMENTS

| CN | 102833447 | 12/2012 |
| CN | 107040675 | 8/2017 |
| JP | H06105089 | 4/1994 |
| JP | H09191376 | 7/1997 |
| JP | 2011193311 | 9/2011 |

OTHER PUBLICATIONS

Office Action of China Counterpart Application, with English translation thereof, dated Nov. 18, 2021, pp. 1-22.

* cited by examiner

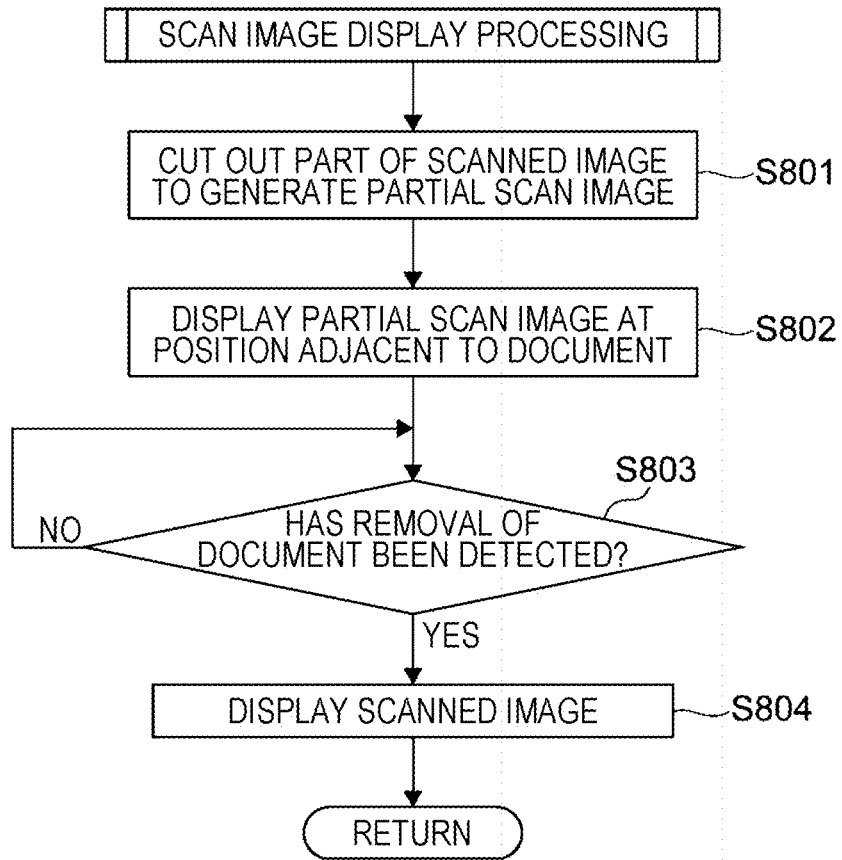

IMAGE READING APPARATUS CAPABLE OF READING AND DISPLAYING IMAGE OF DOCUMENT PLACED ON PLATEN

CROSS-REFERENCE TO RELATED APPLICATIONS

This application is based on and claims priority under 35 USC 119 from Japanese Patent Application No. 2017-219917 filed on Nov. 15, 2017.

BACKGROUND

Technical Field

The present invention relates to an image reading apparatus.

SUMMARY

According to an aspect of the invention, there is provided an image reading apparatus including: a reading unit that reads an image of a document placed on a platen for placing documents; and a display unit that displays part of the image of the document read by the reading unit in a range adjacent to a range, in which the document is placed, of the platen.

BRIEF DESCRIPTION OF THE DRAWINGS

Exemplary embodiment of the present invention will be described in detail based on the following figures, wherein:

FIG. 19 is a flowchart illustrating an operation example of the control device when scan image display processing is performed;

DETAILED DESCRIPTION

Hereinafter, an exemplary embodiment of the invention will be described in detail with reference to the accompanying drawings.

[Entire Configuration of Image Processing Apparatus]

Figure 1:
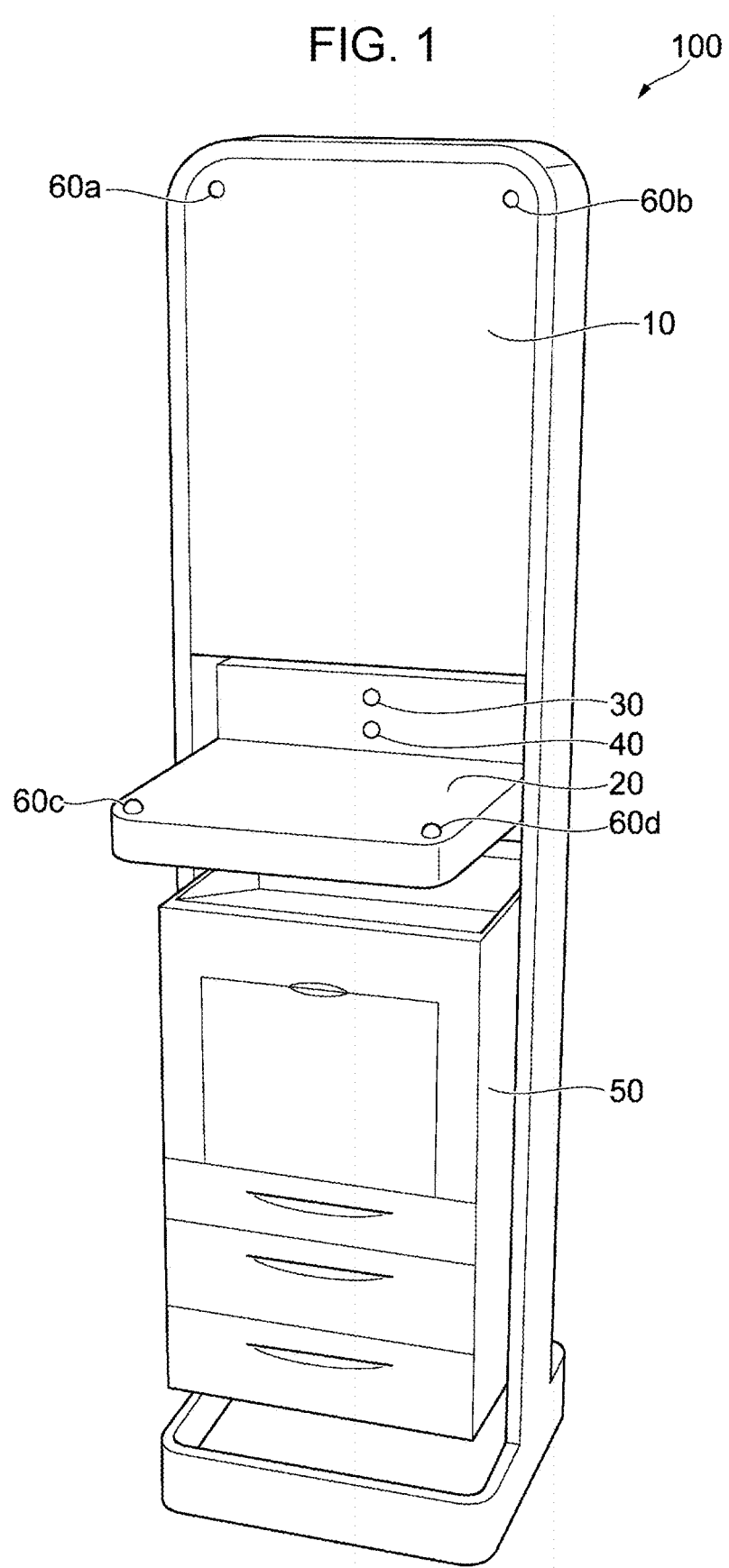
FIG. 1 is a perspective view of an image processing apparatus according to an exemplary embodiment of the invention.

FIG. 1 is a perspective view of an image processing apparatus 100 according to an exemplary embodiment of the invention. As illustrated, the image processing apparatus 100 includes a guide display 10, an operation stand 20, a projector 30, an operation detector 40, a printer 50, and imagers 60a to 60d.

The guide display 10 is a display that displays a message to a user, such as guidance, for an operation of the image processing apparatus 100. Unlike the later-described operation stand 20, even when contact is made with the surface of the guide display 10, contact is not detected. Here, for instance, a liquid crystal display may be used as the guide display 10. In the exemplary embodiment, the guide display 10 is provided as an example of a first display surface that does not detect a contact operation.

The operation stand 20 is a substantially horizontal stand that projects toward a user so that the user can place and operate a mobile information terminal and a document. In this case, the "substantially horizontal" may refer to a horizontal levelness that does not cause a mobile information terminal or a document placed on the operation stand 20 to slip down. The operation stand 20 is designed so that an image is displayed by the function of the later-described projector 30, and contact with the surface of the operation stand 20 is detected by the function of the later-described operation detector 40. However, the operation stand 20 itself may be configured by a display and a projector 30 may not be provided. In the exemplary embodiment, the operation stand 20 is provided as an example of a display surface, a second display surface, and a platen.

The projector 30 is a projector that projects an image onto the operation stand 20. The projector 30 projects an image onto the operation stand 20 in an oblique direction from above because the projector 30 is provided at a lower portion of the guide display 10. The projector 30, however, may be provided vertically above the operation stand 20 to project an image onto the operation stand 20 in a direction from immediately above. Alternatively, the projector 30 may be provided vertically below the operation stand 20, or the projector 30 may project an image onto the operation stand 20 in a direction from immediately below using a mirror along with the projector 30. Here, for instance, a liquid crystal projector may be used as the projector 30.

The operation detector 40 detects an operation by contacting with the surface of the operation stand 20. Detection of the operation may be made by sensing blocking of infrared rays by a finger of a user, the infrared rays radiating to the surface of the operation stand 20 radially. Specifically, for instance, an infrared LED and an infrared sensor may be used as the operation detector 40.

The printer 50 is a printer that prints an image on paper or other media. Here, for instance, an electrophotographic system that forms an image by transferring toner adhering to a photoconductor onto a recording medium, or an inkjet printer that discharges ink on a recording medium to form an image may be used as the printer 50. Alternatively, the printer 50 may be a printer that creates a printed material by pressing a block, to which ink is applied, against paper or other media. In the exemplary embodiment, the printer 50 is provided as an example of the printer.

The imagers 60a to 60d are cameras that capture an image of a document or a mobile information terminal placed on the operation stand 20. Among these, the imagers 60a, 60b are provided at an upper portion of the guide display 10, and thus mainly capture an image of a document or a mobile information terminal placed on the operation stand 20 from above. Also, the imagers 60c, 60d are provided on the near side of the guide display 10, and thus mainly capture an image in an oblique direction from below when a three-dimensional object is placed on the operation stand 20. Like this, the imagers 60a to 60d have different applications according to the positions provided, and hereinafter are referred to as the imager 60 when these imagers are not distinguished from each other. In this case, the imager 60 is provided as a scanner, thus hereinafter "captures something" may also be expressed as "scans something". In the exemplary embodiment, the imager 60 is provided as an example of the reading device. Although four imagers 60 are illustrated in the drawings, the number of imagers 60 is not limited to four. For instance, an imager 60 for detecting a line of sight and/or motion of a user may be provided at a position which allows such detection.

[Hardware Configuration of Image Processing Apparatus]

Figure 2:
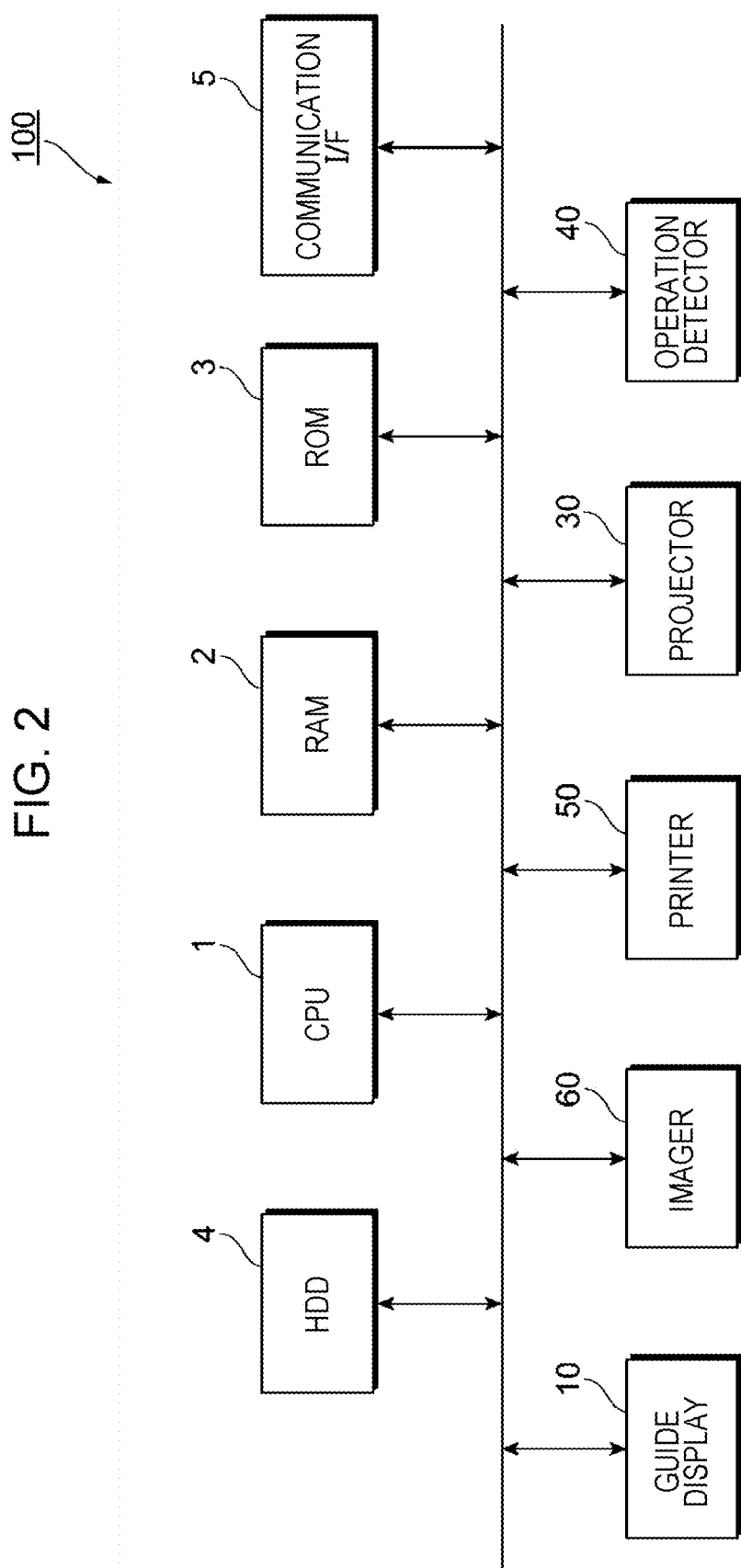
FIG. 2 is a diagram illustrating an example of a hardware configuration of the image processing apparatus according to the exemplary embodiment of the invention.

FIG. 2 is a diagram illustrating an example of a hardware configuration of the image processing apparatus 100 according to the exemplary embodiment. As illustrated, the image processing apparatus 100 includes a central processing unit (CPU) 1, a random access memory (RAM) 2, a read only memory (ROM) 3, a hard disk drive (HDD) 4, a communication interface (hereinafter referred to as a "communication I/F") 5, a guide display 10, a projector 30, an operation detector 40, a printer 50, and an imager 60.

The CPU 1 implements the later-described functions by loading various programs stored in the ROM 3 into the RAM 2, and executing the programs. The RAM 2 is a memory that is used as a memory for work of the CPU 1. The ROM 3 is a memory that stores various programs to be executed by the CPU 1. The HDD 4 is, for instance, a magnetic disk device that stores data scanned by the imager 60, data used by printing in the printer 50 and other data. The communication I/F 5 transmits and receives various information to and from other devices via a communication line.

Since the guide display 10, the projector 30, the operation detector 40, the printer 50, and the imager 60 have been already described with reference to FIG. 1, a description thereof is omitted here.

[Functional Configuration of Control Device]

Figure 3:
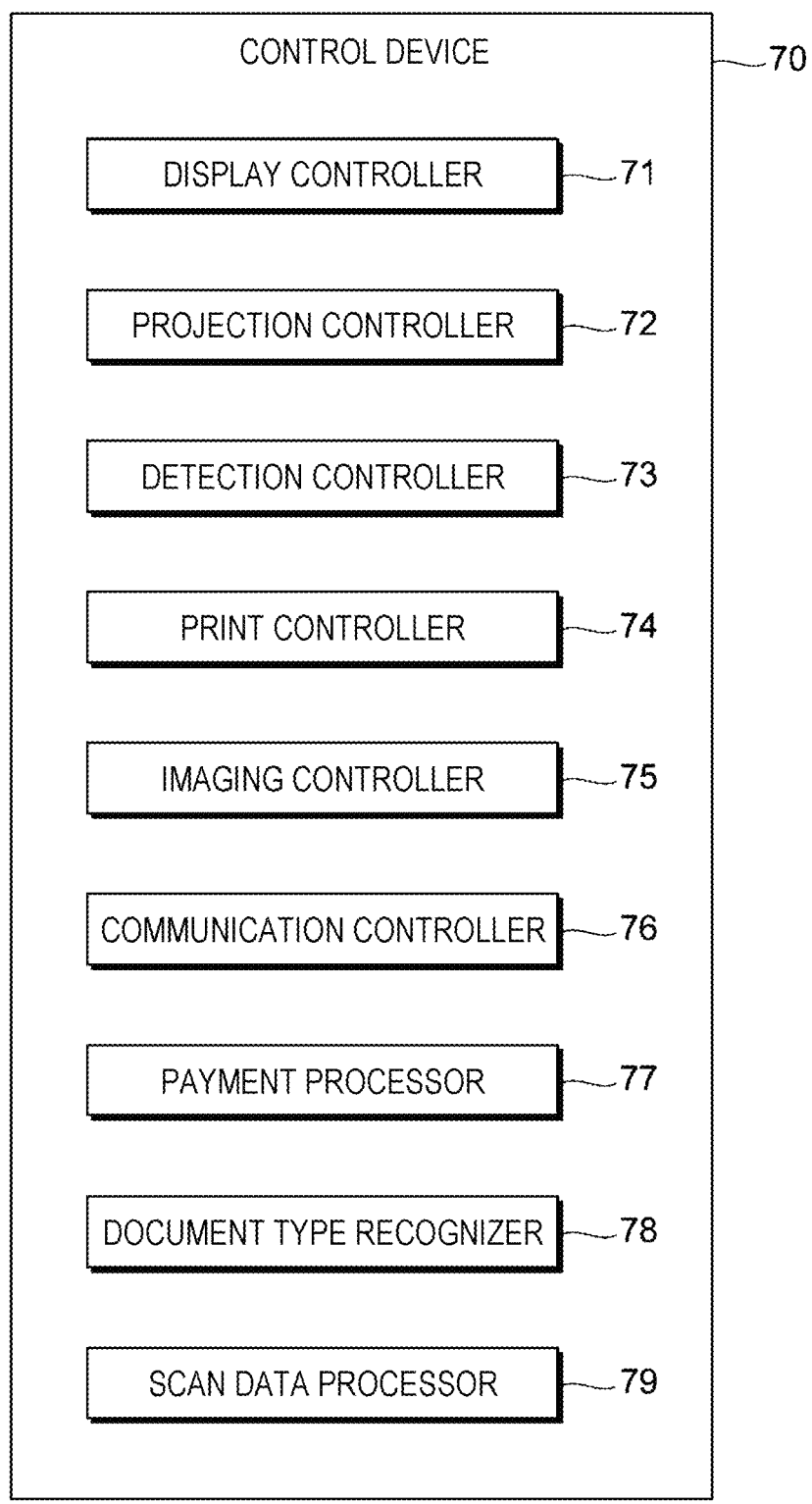
FIG. 3 is a block diagram illustrating a functional configuration example of a control device in the exemplary embodiment of the invention.

FIG. 3 is a block diagram illustrating a functional configuration example of a control device 70 that controls the image processing apparatus 100. Here, the control device 70 is an example of a display device and a an image reading device, and is regarded as a device which is implemented by the CPU 1 (see FIG. 2) of the image processing apparatus 100 in such a manner that the CPU 1 reads a program implementing the later-described functional units, for instance, from the ROM 3 (see FIG. 2) to the RAM 2 (see FIG. 2) and executes the program. As illustrated, the control device 70 includes a display controller 71, a projection controller 72, a detection controller 73, a print controller 74, an imaging controller 75, a communication controller 76, a payment processor 77, a document type recognizer 78, and a scan data processor 79.

The display controller 71 displays various types of guidance and various screens on the guide display 10. In the exemplary embodiment, the display controller 71 is provided as an example of a first display unit that displays information on the first display surface.

The projection controller 72 displays various screens on the operation stand 20 using the projector 30. In the exemplary embodiment, the projection controller 72 is provided as an example of a second display unit that displays information on the display surface, the second display surface, and the platen.

The detection controller 73 determines whether or not the operation detector 40 has detected an operation by contacting with the surface of the operation stand 20. In addition, the detection controller 73 also determines whether or not a human sensor (not illustrated) has detected approach of a user.

The print controller 74 controls printing by the printer 50.

The imaging controller 75 controls the imager 60 to capture an image of a document or a mobile information terminal placed on the operation stand 20, and obtains the image captured by the imager 60. In particular, the imaging controller 75 controls the imager 60 such that when a predetermined time has elapsed since a document is placed on the operation stand 20, the imager 60 scans the document. In the exemplary embodiment, the imaging controller 75 is provided as an example of a reading unit that reads an image. Also, the imaging controller 75 may obtain a detection result from the imager 60 that detects a line of sight and/or motion of a user. In this case, the imaging controller 75 is an example of a detection unit that detects motion of a user.

When information recorded on a card is read by a card reader (not illustrated), the communication controller 76 receives the information from the card reader. Also, when information stored in a mobile information terminal is received by a near field communication (NFC) reader (not illustrated), the communication controller 76 receives the information from the NFC reader. In addition, the communication controller 76 receives information stored in a mobile information terminal via Wi-Fi (registered trademark). Instead of Wi-Fi, Bluetooth (registered trademark) may be used. However, a description is given below with Wi-Fi used. In the exemplary embodiment, the communication controller 76 is provided as an example of a reading unit that reads information.

In addition, the communication controller 76 receives a file from an external cloud system or transmits a file to an external cloud system via the communication I/F 5. In the exemplary embodiment, the communication controller 76 is provided as an example of a receiving unit that receives data from another device, and an example of a transmission unit that transmits data to another device.

The payment processor 77 performs payment-related processing such as generation of payment information based on the information received by the communication controller 76 from the card reader and the information received by the communication controller 76 from Wi-Fi.

When a document is placed on the operation stand 20, the document type recognizer 78 recognizes the type of the document. The type of the document may be recognized, for instance, by pattern matching with image data pre-stored for each type of document.

The scan data processor 79 performs various types of processing on scan data obtained by the imaging controller 75. Here, the various types of processing include processing of scan data, and processing to integrate pieces of scan data obtained by multiple scans. In the exemplary embodiment, the scan data processor 79 is provided as an example of an output unit that outputs an image obtained by integrating two images.

[Screen Display Example of Image Processing Apparatus]

In the exemplary embodiment, final printing and scanning are performed by the image processing apparatus 100, but a prior operation for the printing and scanning is performed by a mobile information terminal such as a smartphone.

Thus, before a screen display example of the image processing apparatus 100 is described, a prior operation performed in the mobile information terminal will be described. An application software (hereinafter referred to as an "application") for utilizing the image processing apparatus 100 is installed in the mobile information terminal, and a user performs the prior operation using the application. It is to be noted that the application used in the exemplary embodiment is only for utilizing the image processing apparatus 100, thus any "application" mentioned in the present description indicates the application for utilizing the image processing apparatus 100.

First, the operation for the first time in the mobile information terminal will be described. When subscribing a service for utilizing the image processing apparatus 100, a user starts up the application by the mobile information terminal, and registers authentication information and other various information for performing authentication in the mobile information terminal.

The various information (hereinafter referred to as "registration information") registered in the mobile information terminal includes a payment method, a print setting, and a storage destination.

In the exemplary embodiment, the image processing apparatus 100 is designed to be installed and utilized in a public space, and thus a payment method has to be registered. Specifically, the payment method indicates how payment is made for printing and scanning, and includes, for instance, payment by a credit card, and payment by an electronic money IC card.

Also, the print setting indicates a desired print style when printing is made. In addition to normal print setting such as monochrome printing or color printing, and single-sided printing or double-sided printing, the print setting also includes a special output style such as stapling, and putting a printed material in an envelope or a vinyl bag.

Also, the storage destination indicates where scan data obtained by scanning a document is stored. The storage destination includes an expense settlement cloud system, a document management cloud system, and a business card management cloud system. These storage destinations may be each registered as the location where scan data of a document is stored according to the type of the document. Registration may be made such that for instance, when the type of a document is receipt, the scan data is stored in the expense settlement cloud system, when the type of a document is A4 paper, the scan data is stored in the document management cloud system, and when the type of a document is business card, the scan data is stored in the business card cloud system.

Next, the operation for the second time and after in the mobile information terminal will be described. For instance, when printing a file stored in a cloud system, a user starts up the application by the mobile information terminal, obtains a list of files from the cloud system, and the list is displayed on the display of the mobile information terminal. In this state, a user reserves printing by designating a file which is desired to be printed. Hereinafter, a file for which printing is reserved is called a "print reservation file". Also, a user registers various information in the print reservation file. For instance, a user sets an output format, and a payment method to the print reservation file. Alternatively, a user may leave the output format and the payment method unset.

Subsequently, for actually printing the file, a user has to go to an installation location of the image processing apparatus 100 in a public space. The application of the mobile information terminal also provides relevant information for this case. For instance, when a user designates a print reservation file and presses down a search button of the mobile information terminal, the application displays a map of the surrounding area of the user on the display of the mobile information terminal, and displays the installation location of an image processing apparatus 100 that can print the print reservation file in consideration of an output format set for the designated print reservation file. Thus, it is possible for the user to go to the installation location of the image processing apparatus 100 and to print the print reservation file which is desired to be printed.

Hereinafter, a screen display example in the image processing apparatus 100 will be described.

(Screen Display Example During Stand-By)

Figure 4:
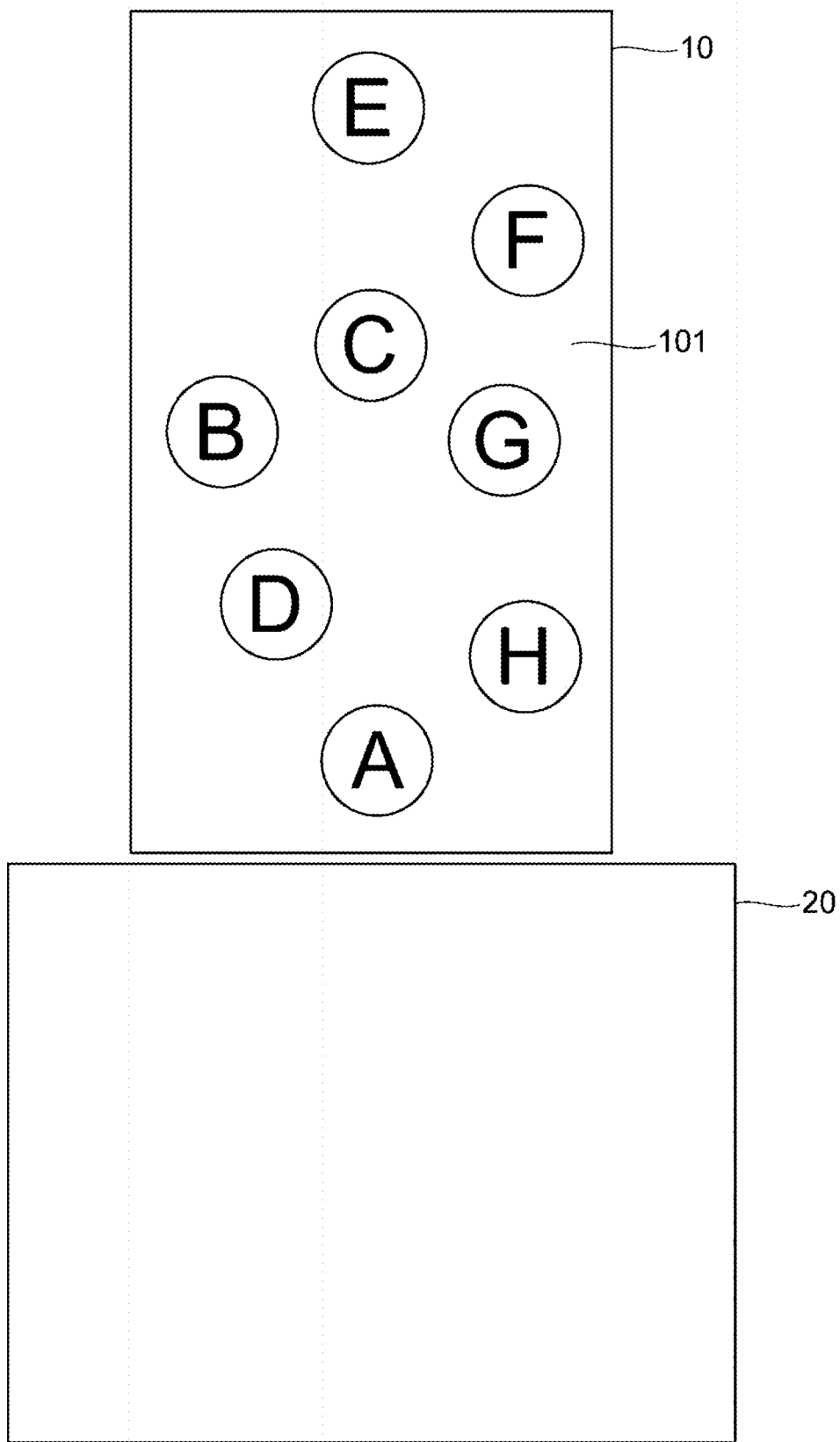
FIG. 4 is a view illustrating a screen display example during stand-by of the image processing apparatus.

FIG. 4 is a view illustrating a screen display example during stand-by of the image processing apparatus 100. As illustrated, the image processing apparatus 100 displays a stand-by screen 101 on the guide display 10 during stand-by. The stand-by screen 101 includes a graphic as an example of a display element that expresses information which is considered to be necessary for a user related to the installation location of the image processing apparatus 100. FIG. 4 illustrates information A to H as an example of such information. The stand-by screen 101 has various versions according to the installation location of the image processing apparatus 100, and the information A to H vary with the version of the stand-by screen 101. For instance, when the image processing apparatus 100 is installed in a station, the stand-by screen 101 is a station version, and the information A to H is the information on train operation, schedule, and travel. Although all graphics indicating the information A to H have the same size in FIG. 4, the size may be changed according to a priority level of information, for instance, a graphic indicating information that is considered to be highly necessary for users is displayed in large size.

In the state where the stand-by screen 101 of FIG. 4 is displayed, when one of a mobile information terminal 90, a document 95, and a three-dimensional object 97 is placed on the operation stand 20 by a user, the image processing apparatus 100 proceeds to one of print processing, two-dimensional scan processing, and three-dimensional scan processing according to the object placed on the operation stand 20. Specifically, when the mobile information terminal 90 is placed on the operation stand 20 by a user, successful authentication based on authentication information transmitted by the application which has been started up in the mobile information terminal 90 causes the image processing apparatus 100 to proceed to the print processing. In contrast, when the document 95 is placed on the operation stand 20 by a user, the image processing apparatus 100 proceeds to the two-dimensional scan processing, and when the three-dimensional object 97 is placed on the operation stand 20 by a user, the image processing apparatus 100 proceeds to the three-dimensional scan processing.

(Screen Display Example at Time of Print Processing)

Figure 5:
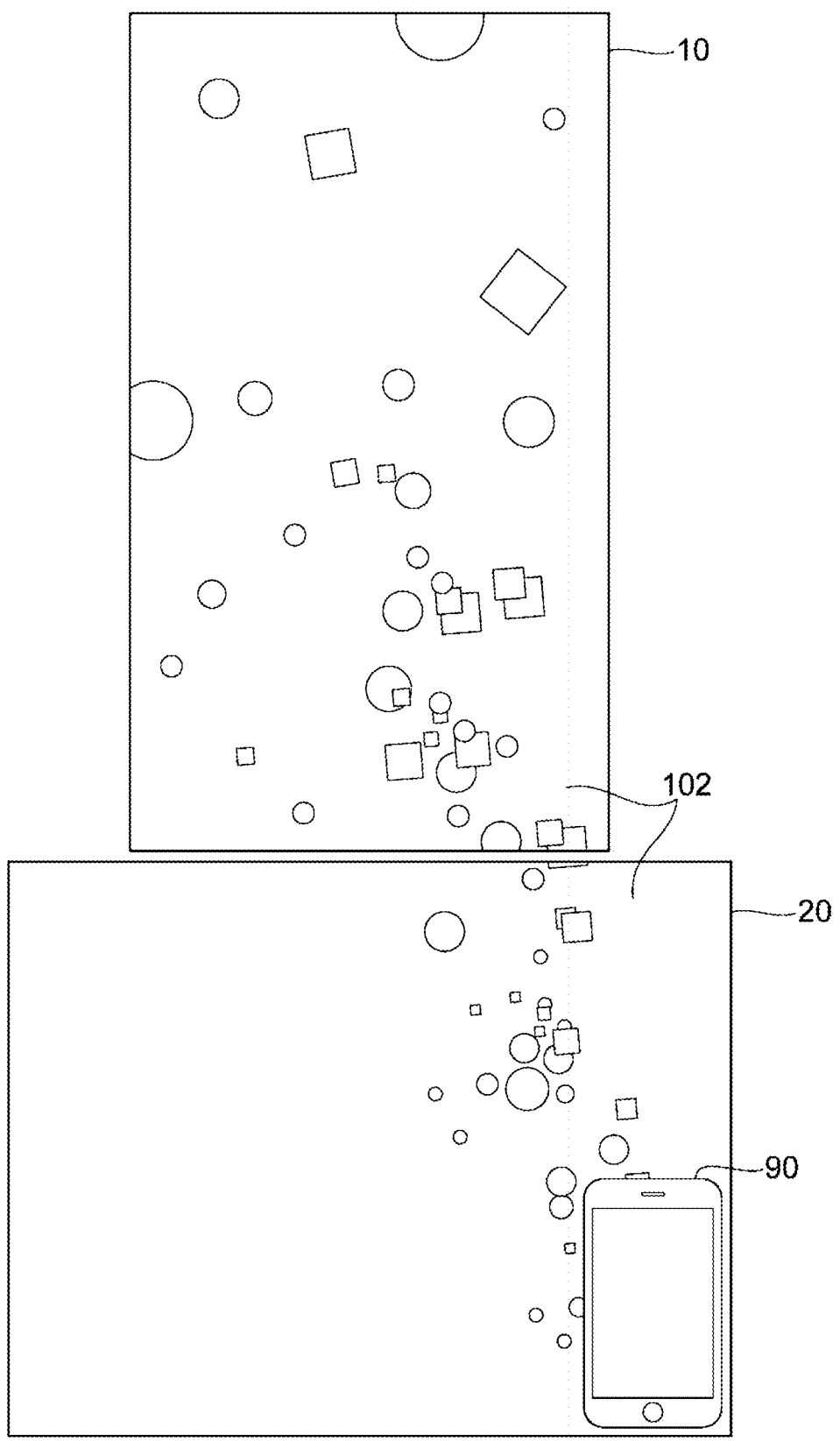
FIG. 5 is a view illustrating a screen display example when login is completed in the image processing apparatus.

FIG. 5 is a view illustrating a screen display example when login is completed in the image processing apparatus 100. When the mobile information terminal 90 is placed on the operation stand 20 by a user and authentication is successful, the image processing apparatus 100 starts print processing. In this process, successful authentication causes login processing to be completed, thus the image processing apparatus 100 first displays a login completion screen 102 on the guide display 10 and the operation stand 20. As illustrated, the login completion screen 102 is a screen in which the mobile information terminal 90, the operation stand 20, and the guide display 10 are linked by animation.

Figure 6:
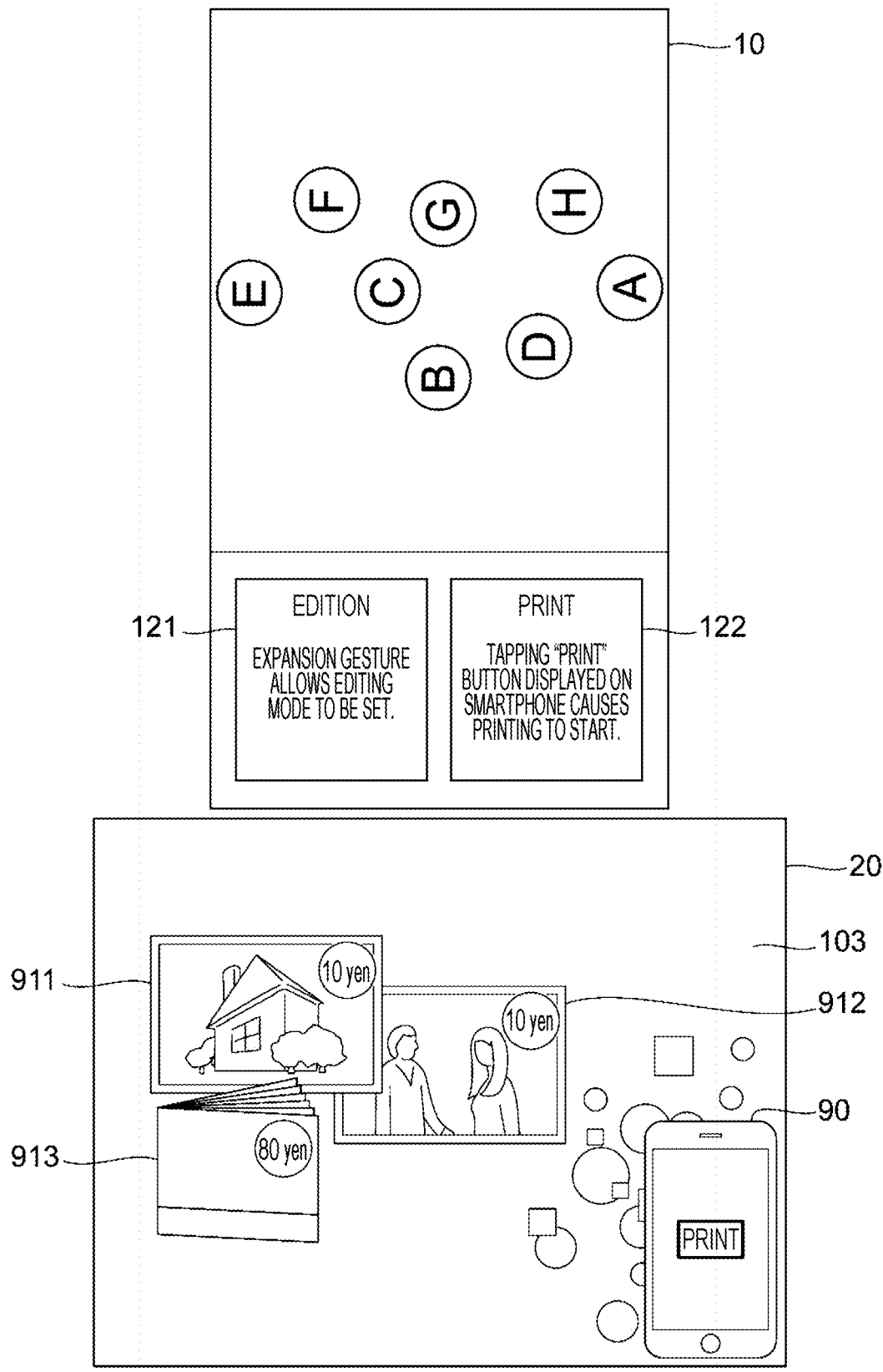
FIG. 6 is a view illustrating a screen display example when a print operation is started in the image processing apparatus.

FIG. 6 is a view illustrating a screen display example when a print operation is started in the image processing apparatus 100. When a print reservation file is designated by the mobile information terminal 90 placed on the operation stand 20, the image processing apparatus 100 displays a print instruction screen 103 on the operation stand 20. The print instruction screen 103 includes an image (hereinafter referred to as a "file image") indicating the print reservation file. FIG. 6 illustrates file images 911 to 913 as an example of such a file image. Furthermore, in FIG. 6, a printing fee is calculated according to the attribute of the print reservation file, and the printing fee is also displayed on the print instruction screen 103. The image processing apparatus 100 displays a guide 121 regarding edition and a guide 122 regarding print on the guide display 10. At this point, as illustrated, the application displays a print button on the display of the mobile information terminal 90.

Figure 7:
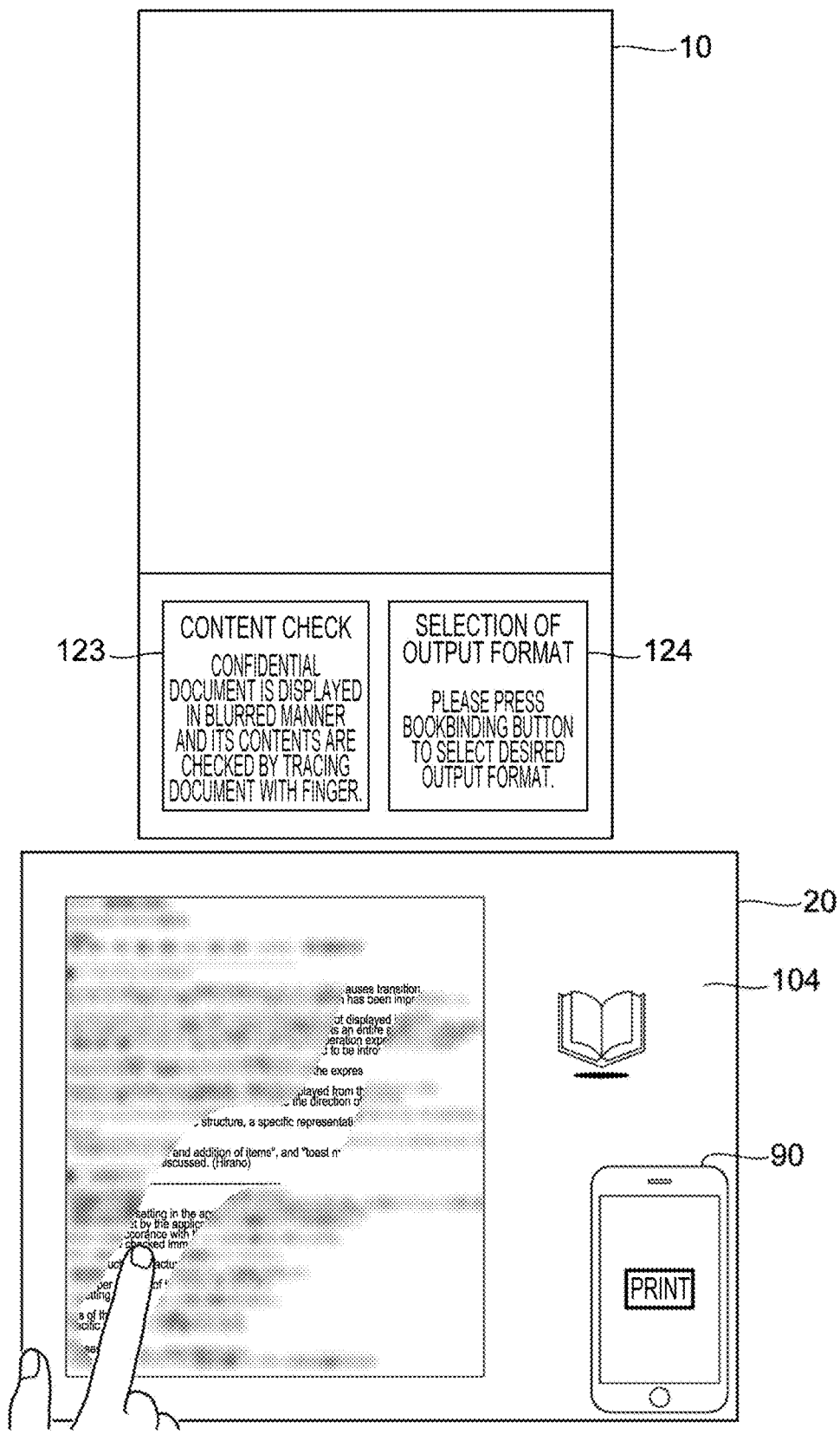
FIG. 7 is a view illustrating a screen display example when file contents are checked in the image processing apparatus.

FIG. 7 is a view illustrating a screen display example when file contents are checked in the image processing apparatus 100. When an expansion gesture is made by a user in accordance with the guide 121 of FIG. 6, the image processing apparatus 100 displays a file content display screen 104 on the operation stand 20. The file content display screen 104 is a screen that displays a document in actual size and allows editing of the document. For instance, when an expansion gesture is made on the file image 913, the contents of the print reservation file represented by the file image 913 are displayed. The image processing apparatus 100 displays a guide 123 regarding content check and a guide 124 regarding an output format. The characters of a confidential document such as an in-house document are first displayed in a blurred manner, and the characters traced by a finger of a user in accordance with the guide 123 may be displayed in a recognizable manner. Alternatively, the characters traced by the palm of a user may be displayed in a more recognizable manner.

Figure 8:
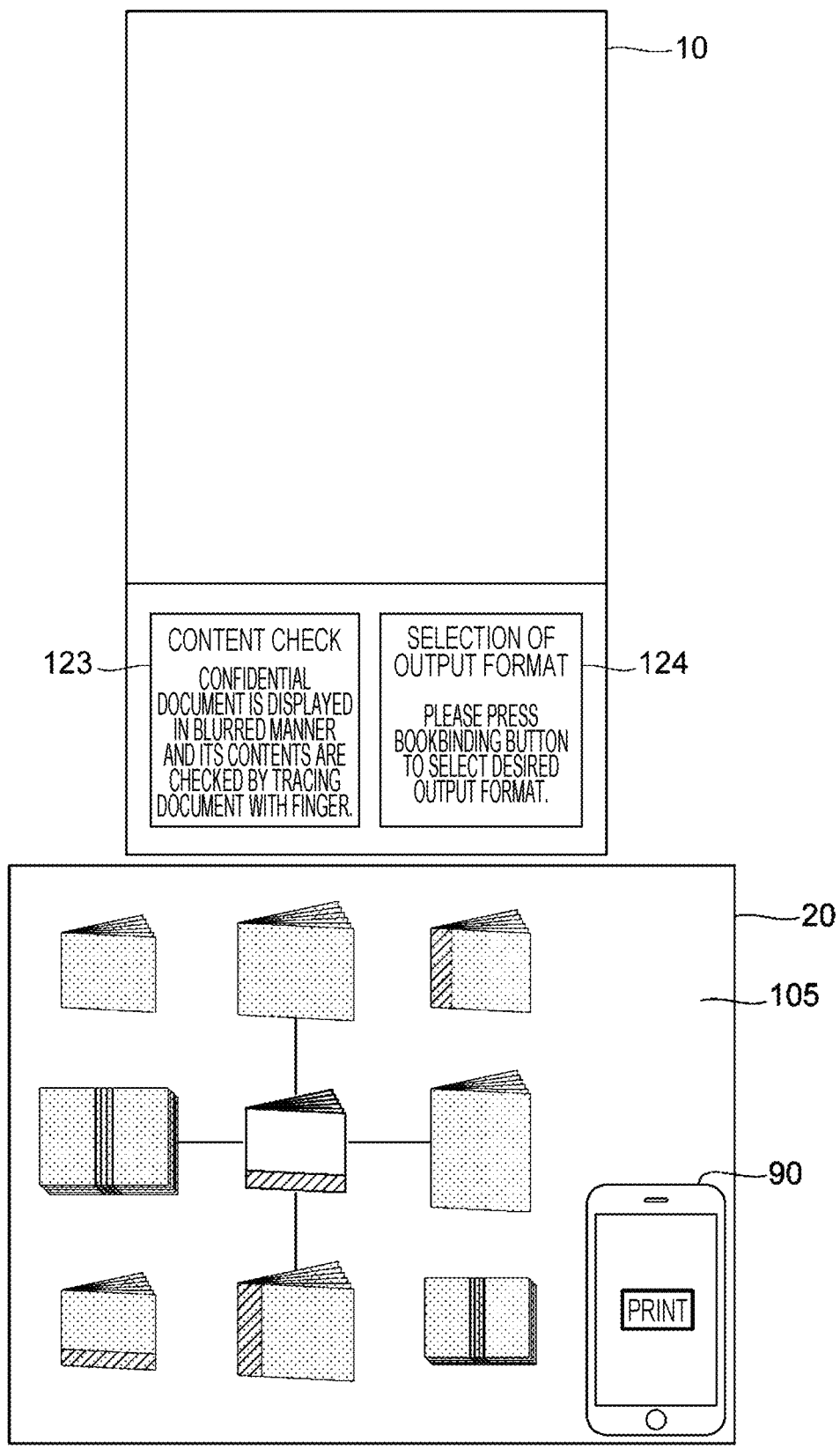
FIG. 8 is a view illustrating a screen display example when an output format is selected in the image processing apparatus.

FIG. 8 is a view illustrating a screen display example when an output format is selected in the image processing apparatus 100. When a bookbinding button (not illustrated) is pressed down by a user in accordance with the guide 124 of FIG. 7, the image processing apparatus 100 displays an output format display screen 105 on the operation stand 20. The output format display screen 105 includes various output formats, and a desired output format is selectable from the output formats. When one of the output formats is selected by a user, the image processing apparatus 100 returns the current screen to the original screen.

Subsequently, in the state where the print instruction screen 103 of FIG. 6 is displayed, when a printing fee is paid and the print button is pressed down by a user, the image processing apparatus 100 starts printing. In this process, the image processing apparatus 100 moves the file images 911 to 913 toward the near side to fade out of sight.

Figure 9:
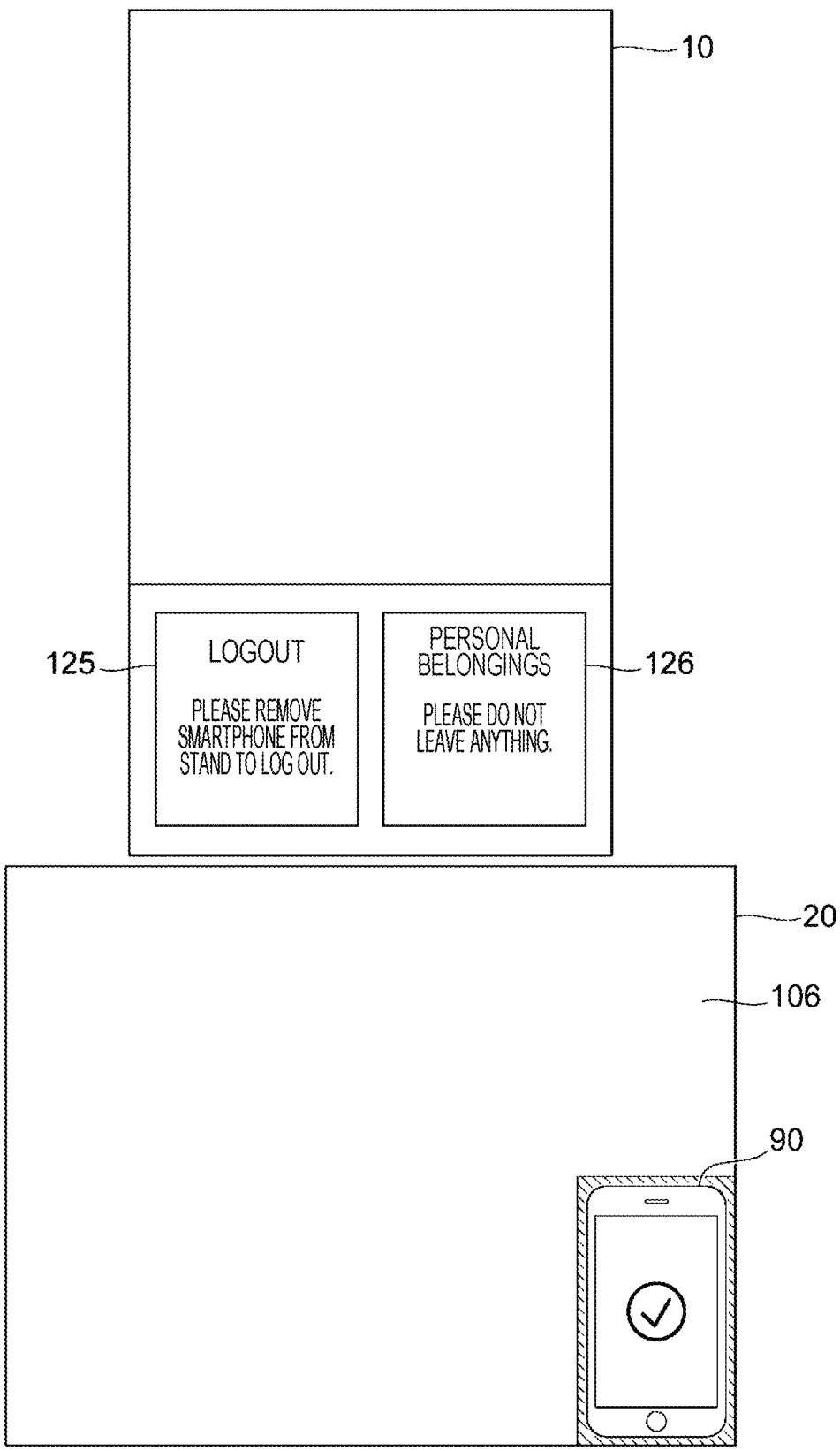
FIG. 9 is a view illustrating a screen display example when a print operation is completed in the image processing apparatus.

FIG. 9 is a view illustrating a screen display example when a print operation is completed in the image processing apparatus 100. When the print operation is completed, the image processing apparatus 100 displays a logout guide screen 106 on the operation stand 20. The logout guide screen 106 includes a faintly shining area around the mobile information terminal 90 for prompting a user to remove the mobile information terminal 90. The image processing apparatus 100 displays a guide 125 regarding logout and a guide 126 regarding personal belongings on the guide display 10. At this point, as illustrated, the application displays a check mark on the display of the mobile information terminal 90 to notify a user of completion of printing.

Thus, when a user removes the mobile information terminal 90 from the operation stand 20, the image processing apparatus 100 performs logout processing, and displays a message indicating completion of logout on the guide display 10 and the operation stand 20. Also, the application displays a message indicating completion of logout on the display of the mobile information terminal 90.

(Screen Display Example at Time of Two-dimensional Scan Processing)

Figure 10:
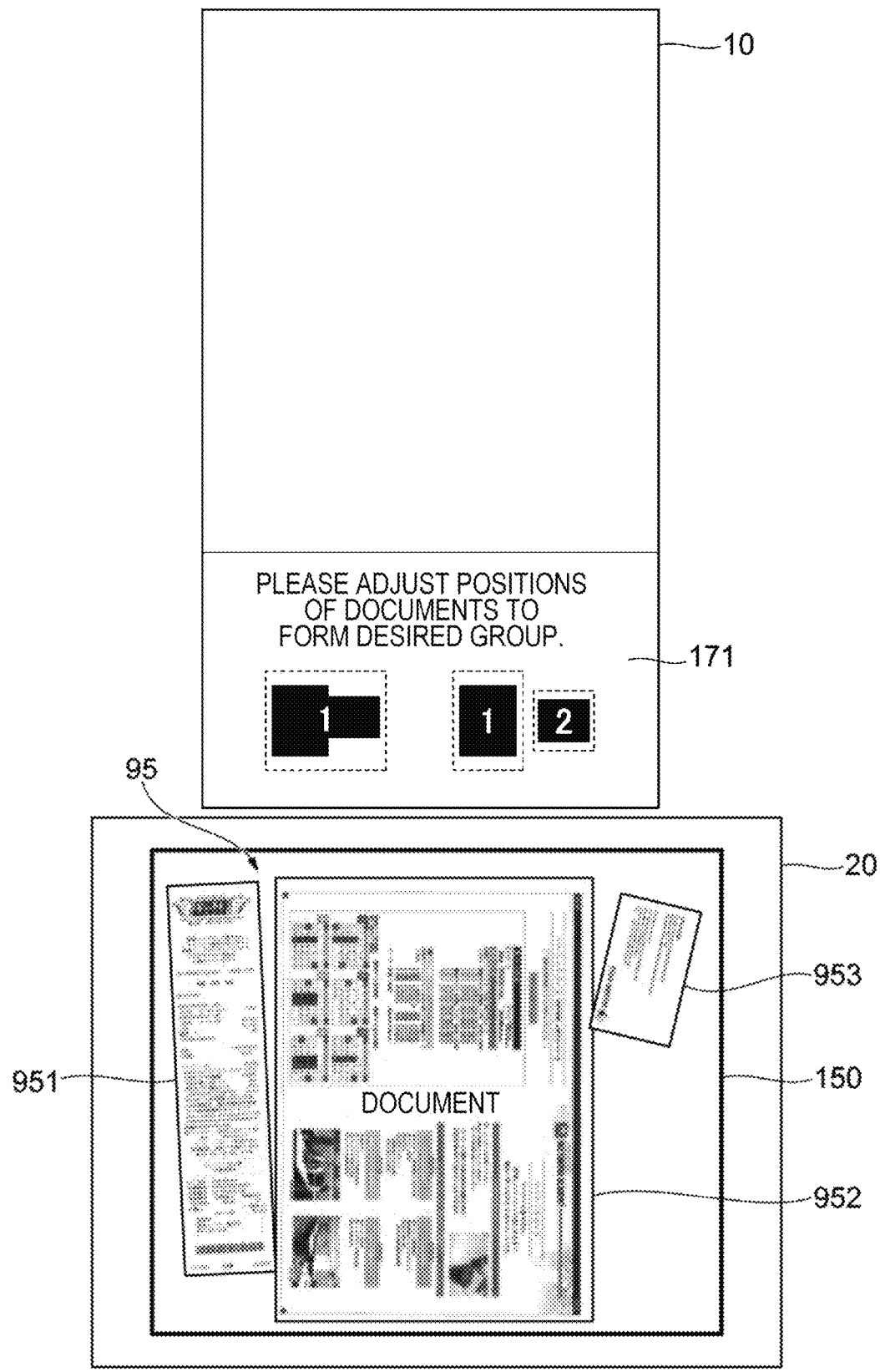
FIG. 10 is a view illustrating a screen display example when documents are placed by a user on an operation stand.
Figure 11:
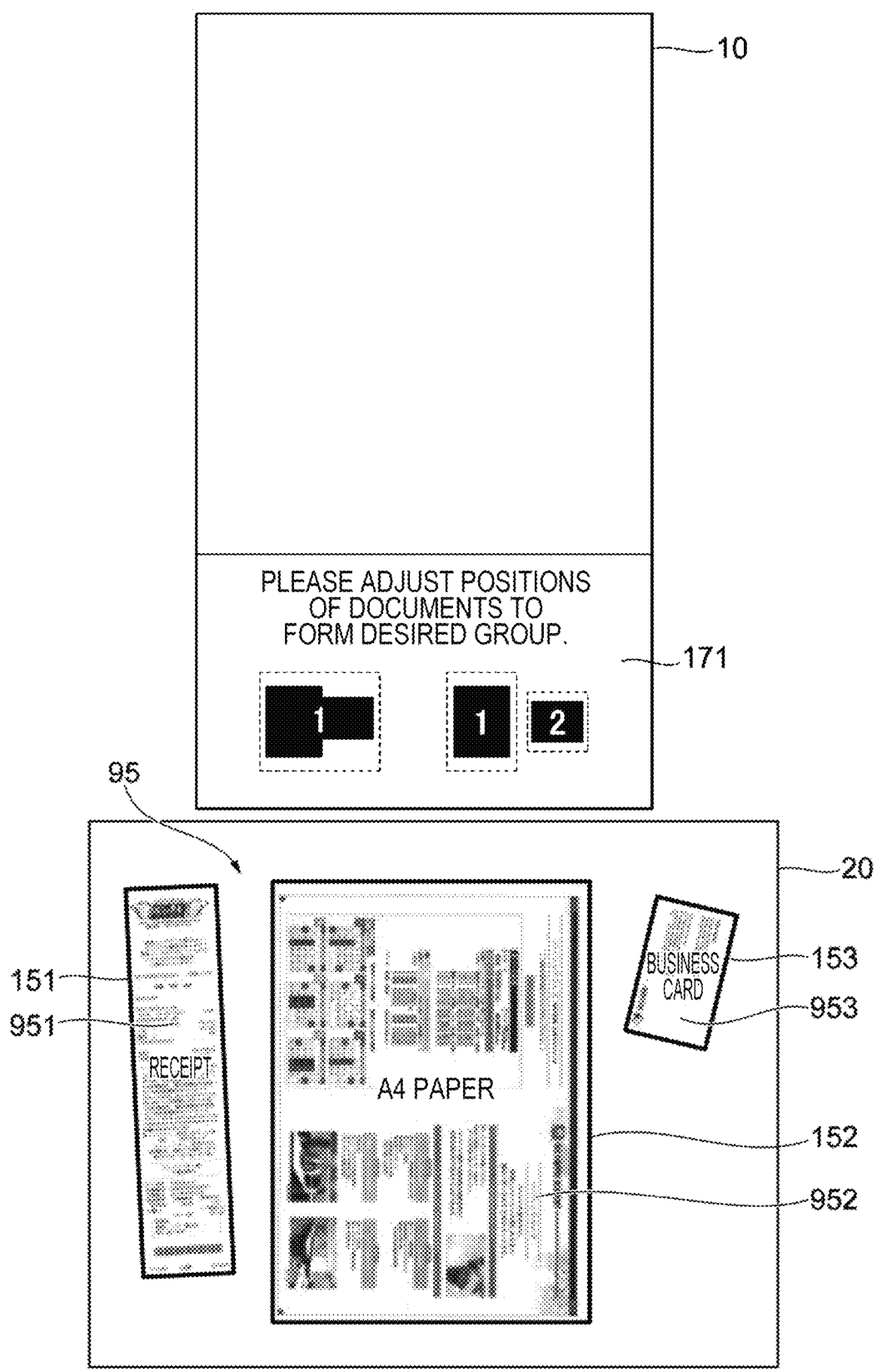
FIG. 11 is a view illustrating a screen display example when documents are placed by a user on an operation stand.

FIGS. 10 and 11 are each a view illustrating a screen display example when the document 95 is placed on the operation stand 20 by a user. When the document 95 is placed on the operation stand 20 by a user, the image processing apparatus 100 displays a guide 171 regarding position adjustment of the document 95 on the guide display 10. First, a case is considered where a receipt 951, an A4 paper 952, and a business card 953 are placed as the document 95 closely to each other on the operation stand 20 by a user in accordance with the guide 171 as illustrated in FIG. 10. In this case, the image processing apparatus 100 recognizes the type of the document 95 as a document, and displays a document type recognition result 150 indicating the type on the operation stand 20. Next, a case is considered where the receipt 951, the A4 paper 952, and the business card 953 are placed as the document 95 apart from each other on the operation stand 20 by a user in accordance with the guide 171 as illustrated in FIG. 11. In this case, the image processing apparatus 100 recognizes the types of the document 95 as a receipt, A4 paper, and a business card, and displays document type recognition results 151 to 153 indicating the types on the operation stand 20.

Subsequently, when a predetermined time elapses with the document 95 placed as illustrated in FIG. 11, the image processing apparatus 100 scans the document 95.

Figure 12:
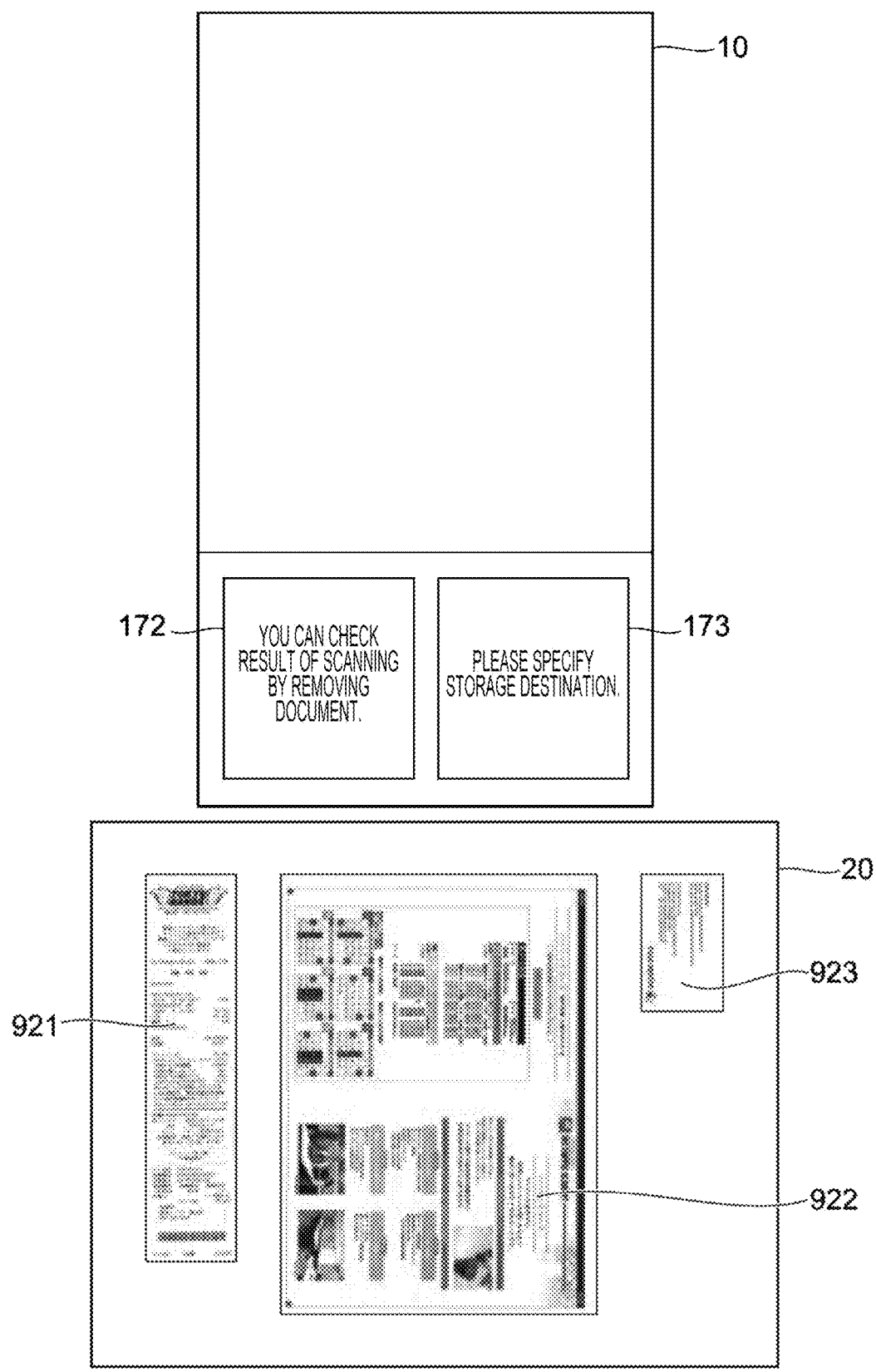
FIG. 12 is a view illustrating a screen display example when two-dimensional scan is completed in the image processing apparatus.

FIG. 12 is a view illustrating a screen display example when the scan is completed in the image processing apparatus 100. When the scan is completed, the image processing apparatus 100 displays a guide 172 regarding removal of the document 95 and a guide 173 regarding storage destination on the guide display 10. When the receipt 951, the A4 paper 952, and the business card 953 are removed from the operation stand 20 by a user in accordance with the guide 172, the image processing apparatus 100 displays a scanned image 921 of the receipt, a scanned image 922 of the A4 paper, and a scanned image 923 of the business card on the operation stand 20. In this process, the image processing apparatus 100 displays the scanned images 921 to 923 in an erect state.

Figure 13:
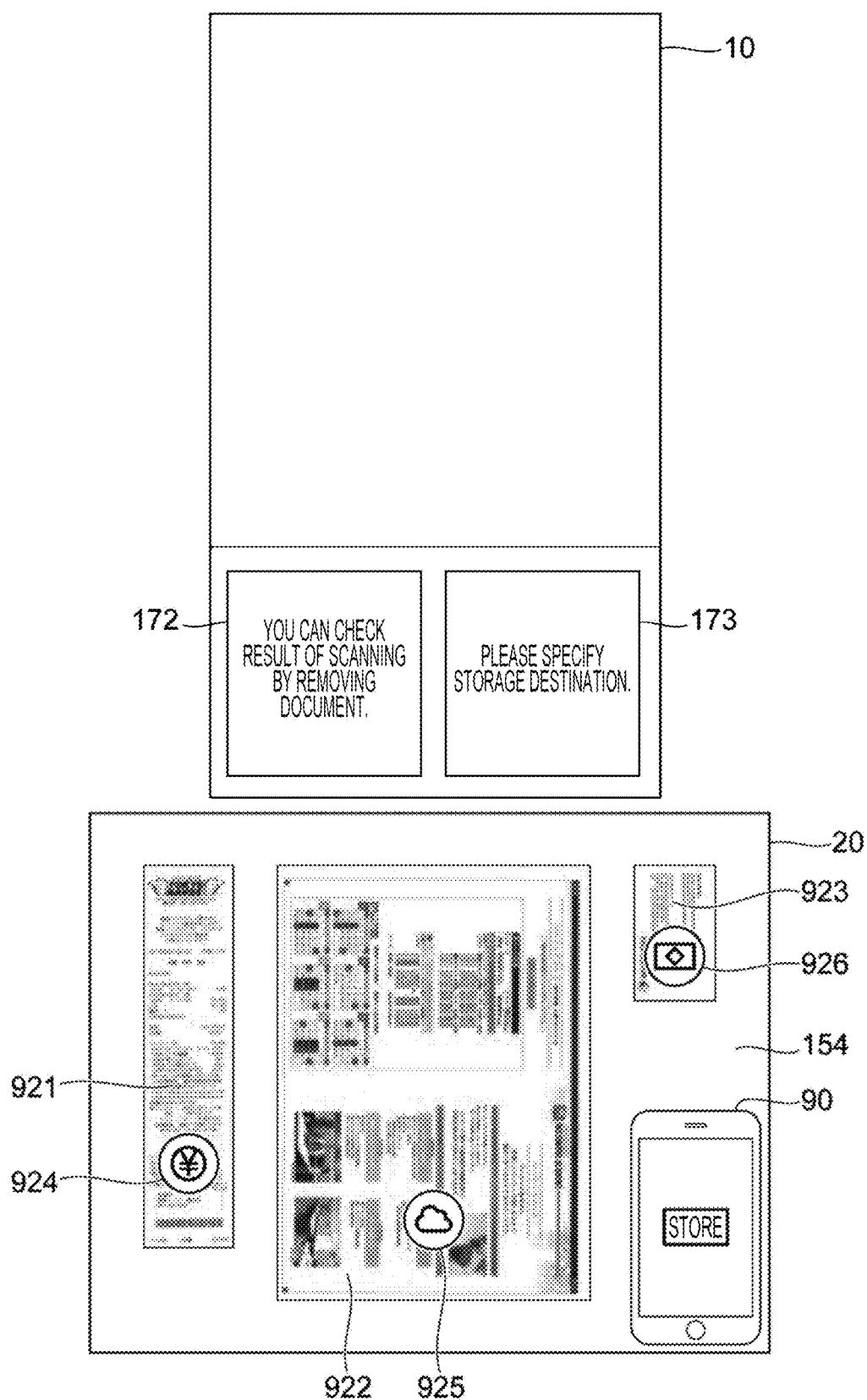
FIG. 13 is a view illustrating a screen display example when a storage operation is started in the image processing apparatus.

FIG. 13 is a view illustrating a screen display example when a storage operation is started in the image processing apparatus 100. When the mobile information terminal 90 is placed on the operation stand 20 by a user, the image processing apparatus 100 displays a storage instruction screen 154 on the operation stand 20. In addition to the scanned images 921 to 923, the storage instruction screen 154 includes storage destination icons 924 to 926 indicating respective storage destinations registered for the types of document in the mobile information terminal 90. Here, the storage destination icon 924 indicates the expense settlement cloud system registered as the storage destination of scan data of receipt. Also, the storage destination icon 925 indicates the document management cloud system registered as the storage destination of scan data of A4 paper. In addition, the storage destination icon 926 indicates the business card management cloud system registered as the storage destination of scan data of business card. In this process, the application displays a storage button on the display of the mobile information terminal 90. When a storage fee is paid and the storage button is pressed down on the storage instruction screen 154 by a user, the image processing apparatus 100 stores the scan data of the receipt, A4 paper, and business card in the respective corresponding cloud systems.

Subsequently, as illustrated in FIG. 9, the image processing apparatus 100 displays the guide 125 regarding logout, and the guide 126 regarding personal belongings on the guide display 10. Thus, when a user removes the mobile information terminal 90 from the operation stand 20, the image processing apparatus 100 performs logout processing, and displays a message indicating completion of logout on the guide display 10 and the operation stand 20. Also, the application displays a message indicating completion of logout on the mobile information terminal 90.

(Screen Display Example at Time of Three-dimensional Scan Processing)

When a predetermined time elapses with the three-dimensional object 97 placed on the operation stand 20, the image processing apparatus 100 scans the three-dimensional object 97. When the three-dimensional object 97 is removed from the operation stand 20 by a user, the image processing apparatus 100 displays a result of scanning the three-dimensional object 97 on the guide display 10 and the operation stand 20.

Figure 14:
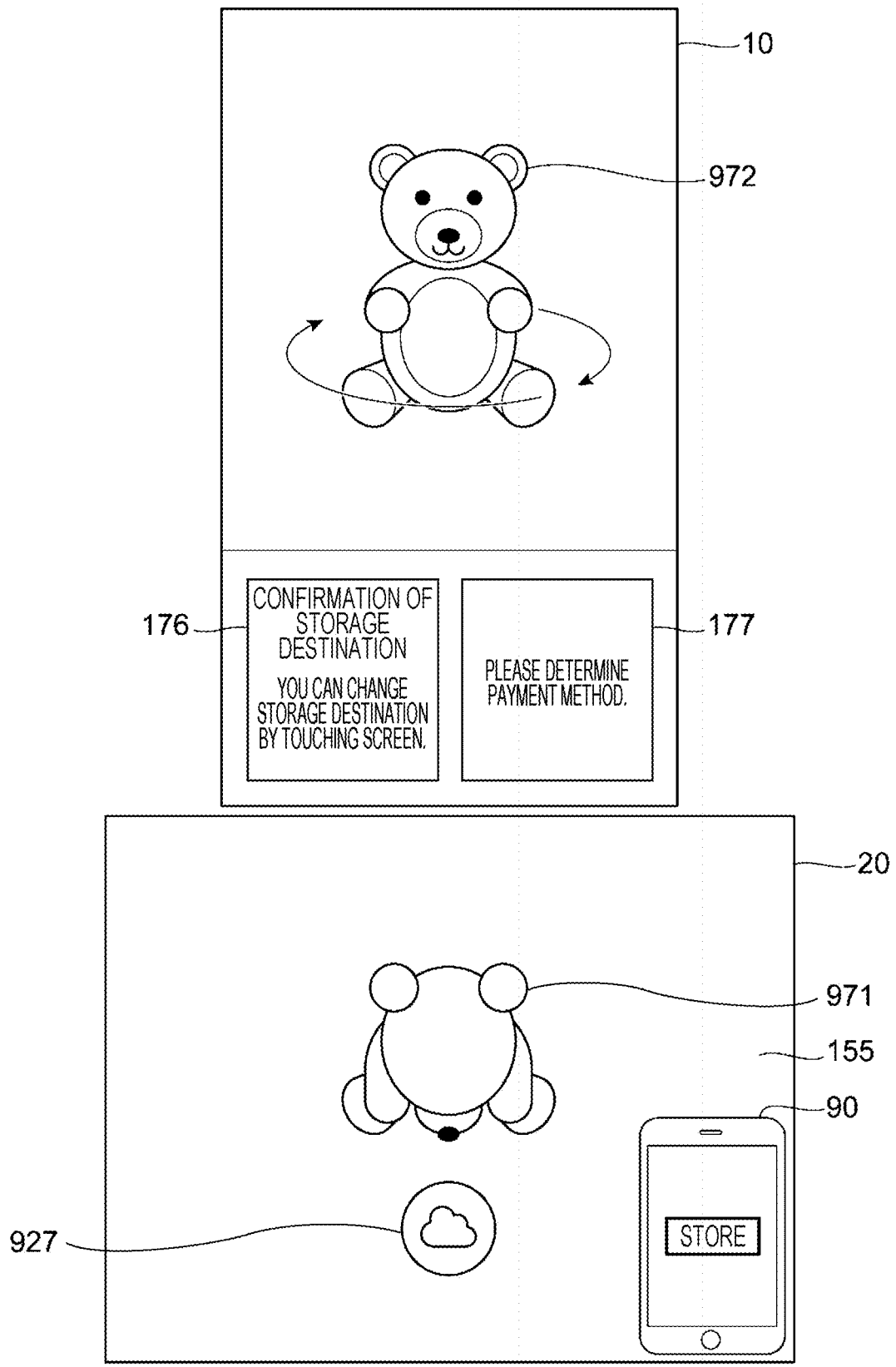
FIG. 14 is a view illustrating a screen display example when three-dimensional scan is completed in the image processing apparatus.

FIG. 14 is a view illustrating a screen display example when the scan is completed in the image processing apparatus 100. When the scan is completed, the image processing apparatus 100 displays a planar image 971 of a scan result on the operation stand 20. On the other hand, the image processing apparatus 100 displays a three-dimensional image 972 of a scan result on the guide display 10. The three-dimensional image 972 is displayed while being rotated as indicated by an arrow in FIG. 14, thereby allowing a user to check the three-dimensional shape of the scan result. In addition, the image processing apparatus 100 displays a guide 176 regarding confirmation of a storage destination and a guide 177 regarding determination of a payment method on the guide display 10. When the mobile information terminal 90 is placed on the operation stand 20 by a user in this state, the image processing apparatus 100 displays a storage instruction screen 155 on the operation stand 20. In addition to the planar image 971 of the scan result, the storage instruction screen 155 includes a storage destination icon 927 indicating a storage destination registered in the mobile information terminal 90. Here, the storage destination icon 927 indicates a cloud system which is registered as the storage destination of scan data of three-dimensional objects. In this process, the application displays a storage button on the display of the mobile information terminal 90. When a storage fee is paid and the storage button is pressed down on the storage instruction screen 155 by a user, the image processing apparatus 100 stores the scan data of the three-dimensional object 97 in a corresponding cloud system.

Subsequently, as illustrated in FIG. 9, the image processing apparatus 100 displays the guide 125 regarding logout, and the guide 126 regarding personal belongings on the guide display 10. Thus, when the mobile information terminal 90 is removed from the operation stand 20 by a user, the image processing apparatus 100 performs logout processing, and displays a message indicating completion of logout on the guide display 10 and the operation stand 20. Also, the application displays a message indicating completion of logout on the mobile information terminal 90.

[Operation Example of Control Device]

Figure 15:
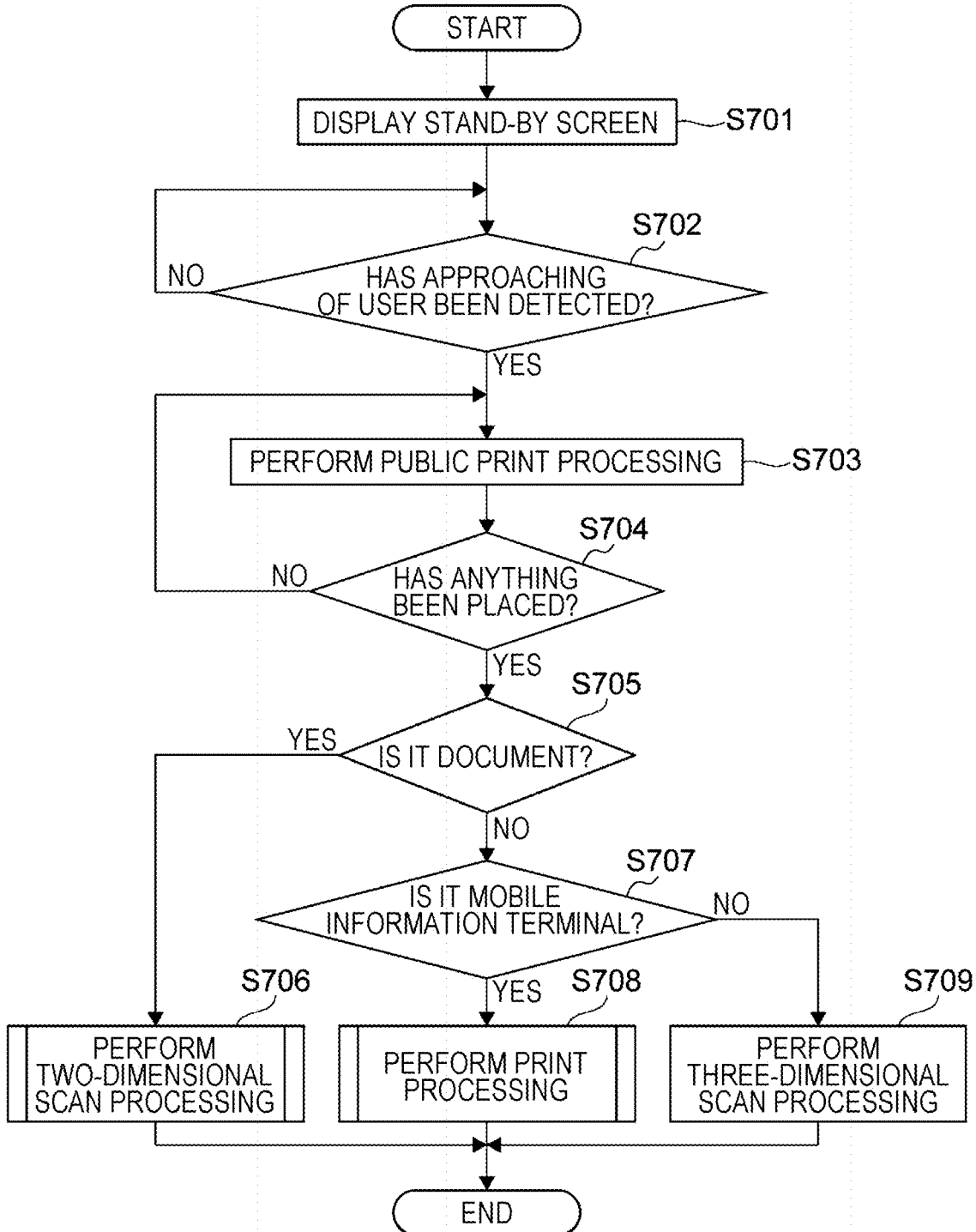
FIG. 15 is a flowchart illustrating an operation example of the control device in the exemplary embodiment of the invention.

FIG. 15 is a flowchart illustrating an operation example of the control device 70 that performs such screen display.

As illustrated, in the control device 70, the display controller 71 first displays the stand-by screen 101 on the guide display 10 (step 701).

Next, the detection controller 73 determines whether or not a human sensor has detected approach of a user (step 702). When it is determined that the human sensor has not detected approach of a user, the detection controller 73 repeats step 702, whereas when it is determined that the human sensor has detected approach of a user, the control device 70 performs public print processing to print information necessary for a user in a public space (step 703).

Subsequently, the imaging controller 75 determines whether or not the imager 60 has detected anything placed on the operation stand 20 (step 704). When it is determined that the imager 60 has not detected anything placed on the operation stand 20, the control device 70 continues the public print processing.

On the other hand, when it is determined that the imager 60 has detected anything placed on the operation stand 20, the imaging controller 75 determines whether or not the imager 60 has detected the document 95 placed on the operation stand 20 (step 705). As a result, when it is determined that the imager 60 has detected the document 95 placed on the operation stand 20, the control device 70 performs two-dimensional scan processing (step 706).

Also, when it is determined that the imager 60 has not detected the document 95 placed on the operation stand 20, the imaging controller 75 determines whether or not the imager 60 has detected the mobile information terminal 90 placed on the operation stand 20 (step 707). As a result, when it is determined that the imager 60 has detected the mobile information terminal 90 placed on the operation stand 20, the control device 70 performs print processing (step 708). At this point, in the control device 70, it is assumed that the communication controller 76 obtains authentication information registered in the mobile information terminal 90 before the print processing is performed, makes authentication and Wi-Fi connection setting based on the authentication information, and receives registration information from the mobile information terminal 90 via Wi-Fi. On the other hand, when it is determined that the imager 60 has not detected the mobile information terminal 90 placed on the operation stand 20, the control device 70 performs three-dimensional scan processing (step 709).

Figure 16:
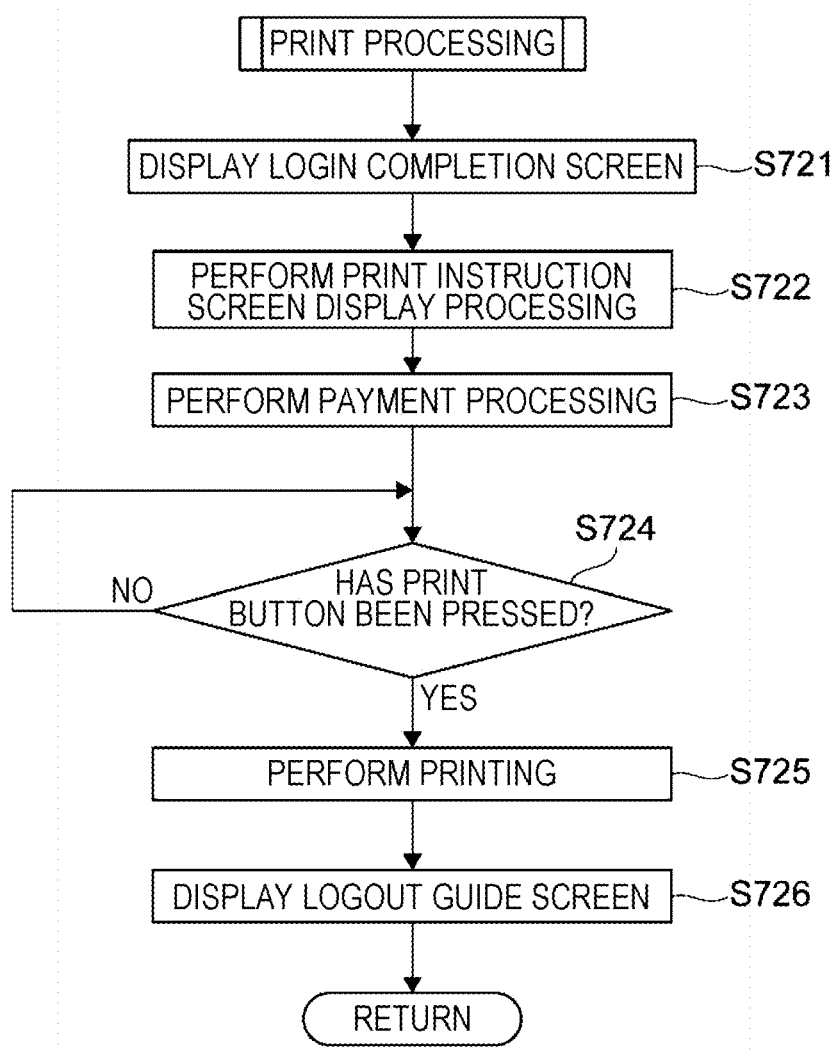
FIG. 16 is a flowchart illustrating an operation example of the control device when print processing is performed.

FIG. 16 is a flowchart illustrating an operation example of the control device 70 when the print processing in step 708 of FIG. 15 is performed.

As illustrated, the control device 70 first displays the login completion screen 102 on the guide display 10 and the operation stand 20 (step 721). Specifically, the display controller 71 displays part of the login completion screen 102 on the guide display 10, and the projection controller 72 displays the remaining part of the login completion screen 102 on the operation stand 20 using the projector 30.

Next, the projection controller 72 performs print instruction screen display processing to display a print instruction screen 103 on the operation stand 20 using the projector 30, the print instruction screen 103 for giving an instruction to print a print reservation file (step 722).

Subsequently, the payment processor 77 performs payment processing by a payment method registered for the print reservation file in the registration information or a payment method selected then (step 723). The communication controller 76 then determines whether or not notification that the print button has been pressed down in the mobile information terminal 90 has been received via Wi-Fi (step 724). When it is determined that notification that the print button has been pressed down in the mobile information terminal 90 has not been received via Wi-Fi, the communication controller 76 repeats step 724, whereas when it is determined that notification that the print button has been pressed down in the mobile information terminal 90 has been received via Wi-Fi, the print controller 74 performs control so that printing is made by the printer 50 (step 725).

Subsequently, when printing by the printer 50 is completed, the projection controller 72 displays the logout guide screen 106 on the operation stand 20 using the projector 30 (step 726).

Figure 17:
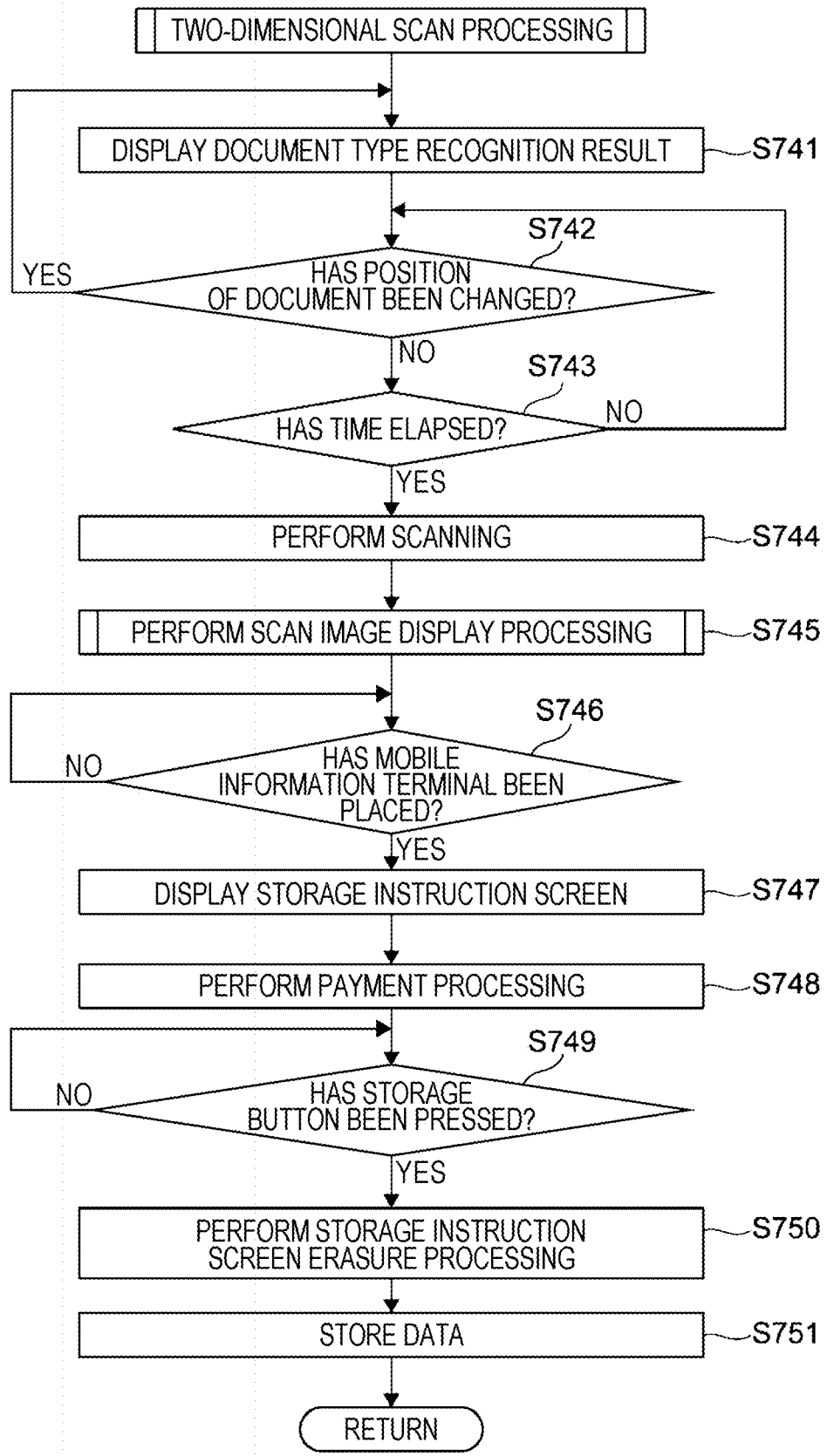
FIG. 17 is a flowchart illustrating an operation example of the control device when two-dimensional scan processing is performed.

FIG. 17 is a flowchart illustrating an operation example of the control device 70 when the two-dimensional scan processing in step 706 of FIG. 15 is performed.

As illustrated, the control device 70 first displays a document type recognition result on the operation stand 20 (step 741). Specifically, the imaging controller 75 obtains the image of the document 95 captured by the imager 60, the document type recognizer 78 recognizes the type of the document 95, for instance, by pattern matching, and the projection controller 72 displays a result of the recognition on the operation stand 20 using the projector 30.

Next, the imaging controller 75 determines whether or not the imager 60 has detected change in the position of the document 95 (step 742). When it is determined that the imager 60 has detected change in the position of the document 95, the control device 70 performs step 741 again. When it is determined that the imager 60 has not detected change in the position of the document 95, the imaging controller 75 determines whether or not a predetermined time has elapsed (step 743). When it is determined that a predetermined time has not elapsed, the imaging controller 75 performs step 742 again.

When it is determined that a predetermined time has elapsed, the imaging controller 75 scans the document 95 placed on the operation stand 20 using the imager 60 (step 744). Thus, the projection controller 72 performs scan image display processing to display the scanned image 92 on the operation stand 20 using the projector 30 (step 745).

Next, the imaging controller 75 determines whether or not the imager 60 has detected the mobile information terminal 90 placed on the operation stand 20 (step 746). When it is determined that the imager 60 has not detected the mobile information terminal 90 placed on the operation stand 20, the imaging controller 75 repeats step 746, whereas when it is determined that the imager 60 has detected the mobile information terminal 90 placed on the operation stand 20, the projection controller 72 displays a storage instruction screen on the operation stand 20 using the projector 30, the storage instruction screen for giving an instruction to store scan data (step 747). At this point, it is assumed that the communication controller 76 obtains authentication information registered in the mobile information terminal 90, makes authentication and Wi-Fi connection setting based on the authentication information, and receives registration information from the mobile information terminal 90 via Wi-Fi.

Subsequently, the payment processor 77 performs payment processing by a payment method registered for the type of the document 95 in the registration information or a payment method selected then (step 748). The communication controller 76 then determines whether or not notification that the storage button has been pressed down in the mobile information terminal 90 has been received via Wi-Fi (step 749). When it is determined that notification that the storage button has been pressed down in the mobile information terminal 90 has not been received via Wi-Fi, the communication controller 76 repeats step 749, whereas when it is determined that notification that the storage button has been pressed down in the mobile information terminal 90 has been received via Wi-Fi, the projection controller 72 performs storage instruction screen erasure processing to erase the storage instruction screen 154 (step 750). The communication controller 76 then transmits the scan data of the document 95 to a storage destination registered for the type of the document 95 via the communication I/F 5, and stores the scan data (step 751).

[Screen Display Example at Time of Scan Image Display Processing of Image Processing Apparatus]

In the exemplary embodiment, the image processing apparatus 100 displays part of a scanned image in a range adjacent to the range, in which the document 95 is placed, of the operation stand 20, and in response to an operation to remove the document 95 from the operation stand 20, displays the scanned image in a range which has an overlapping area with the range, in which the document 95 is placed, of the operation stand 20. However, hereinafter a description is given using an example in which the range defined by a position shifted in a lower right direction from the document 95 provides the range adjacent to the range in which the document 95 is placed, and the range in which the document 95 is placed provides the range which has an overlapping area with the range in which the document 95 is placed.

Figure 18:
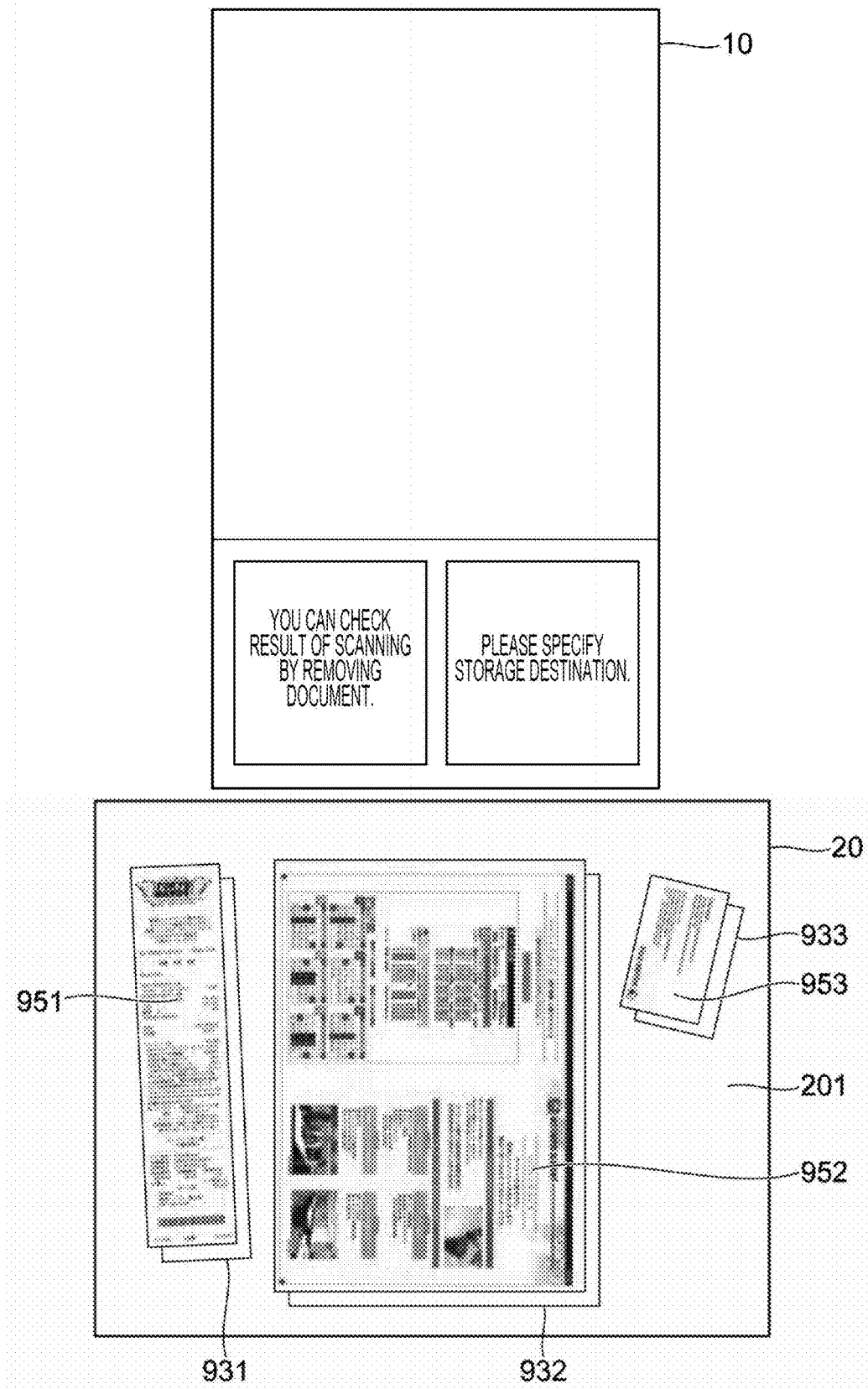
FIG. 18 is a view illustrating a screen display example which is displayed in scan image display processing.

FIG. 18 is a view illustrating a screen display example which is displayed in the scan image display processing in step 745 of FIG. 17. As in FIG. 11, when scan is performed with the receipt 951, the A4 paper 952, and the business card 953 placed on the operation stand 20, the image processing apparatus 100 displays a scan completion notification screen 201 on the operation stand 20. The scan completion notification screen 201 includes a partial scanned image 931 of the receipt at a position shifted in a lower right direction from the receipt 951, the partial scanned image 931 being part of the scanned image of the receipt. In addition, the scan completion notification screen 201 includes a partial scanned image 932 of the A4 paper 952 at a position shifted in a lower right direction from the A4 paper 952, the partial scanned image 932 being part of the scanned image of the A4 paper 952. Furthermore, the scan completion notification screen 201 includes a partial scanned image 933 of the business card 953 at a position shifted in a lower right direction from the business card 953, the partial scanned image 932 being part of the scanned image of the business card 953.

Subsequently, when the receipt 951, the A4 paper 952, and the business card 953 are removed by a user, as illustrated in FIG. 12, the image processing apparatus 100 displays the scanned image 921 of the entire receipt, the scanned image 922 of the entire A4 paper, and the scanned image 923 of the entire business card on the operation stand 20 at the respective positions where the receipt 951, the A4 paper 952, and the business card 953 have been placed.

It is to be noted that in the above, in response to an operation to remove the document 95 from the operation stand 20, the scanned images are displayed. This is due to the assumption that a scanned image is displayed by projecting an image onto the operation stand 20 from above using the projector 30. However, when the operation stand 20 itself displays a scanned image as a display or when a scanned image is displayed by projecting an image onto the operation stand 20 from below, a scanned image does not have to be displayed in response to an operation to remove the document 95 from the operation stand 20. For instance, when the document 95 is scanned, a scanned image may be displayed in a range which has an overlapping area with the range in which the document 95 is placed on the operation stand 20.

Also, in the above, the scan completion notification screen 201 is assumed to include a partial scanned image which is part of a scanned image. However, without being limited to this, when an image is projected onto the operation stand 20 from above using the projector 30, the scan completion notification screen 201 may include an additional image added to the document 95 to indicate that the document 95 has been scanned. Here, the additional image may be, for instance, an image indicating that the document 95 can be turned over, added to the lower right corner of the document 95, or an image of a character string such as "scanned already" added to the center of the document 95. In addition, when the operation stand 20 itself displays a scanned image as a display or when a scanned image is displayed by projecting an image onto the operation stand 20 from below, the scan completion notification screen 201 may include an image having an effect recognizable from above the document 95 to indicate that the document 95 has been scanned. Here, an image having an effect recognizable from above the document 95 may be, for instance, a shining image of the periphery of the document 95 on the operation stand 20.

[Operation Example at Time of Scan Image Display Processing of Control Device]

FIG. 19 is a flowchart illustrating an operation example of the control device 70 when the scan image display processing in step 745 of FIG. 17 is performed.

As illustrated, in the control device 70, the projection controller 72 first generates a partial scanned image by cutting out part of a scanned image which is obtained from the imager 60 by the imaging controller 75 (step 801). Next, the projection controller 72 displays the partial scan image at a position adjacent to the document 95 on the operation stand 20 using the projector 30 (step 802).

Subsequently, the imaging controller 75 determines whether or not the imager 60 has detected removal of the document 95 from the operation stand 20 by a user (step 803). When it is determined that the imager 60 has not detected removal of the document 95 from the operation stand 20 by a user, the imaging controller 75 repeats step 803, whereas when it is determined that the imager 60 has detected removal of the document 95 from the operation stand 20 by a user, the projection controller 72 displays the entire scanned image 92 of the document 95 using the projector 30 at the position where the document 95 has been placed on the operation stand 20 (step 804).

[Screen Display Example at Time of Scan Data Processing of Image Processing Apparatus]

Figure 20A:
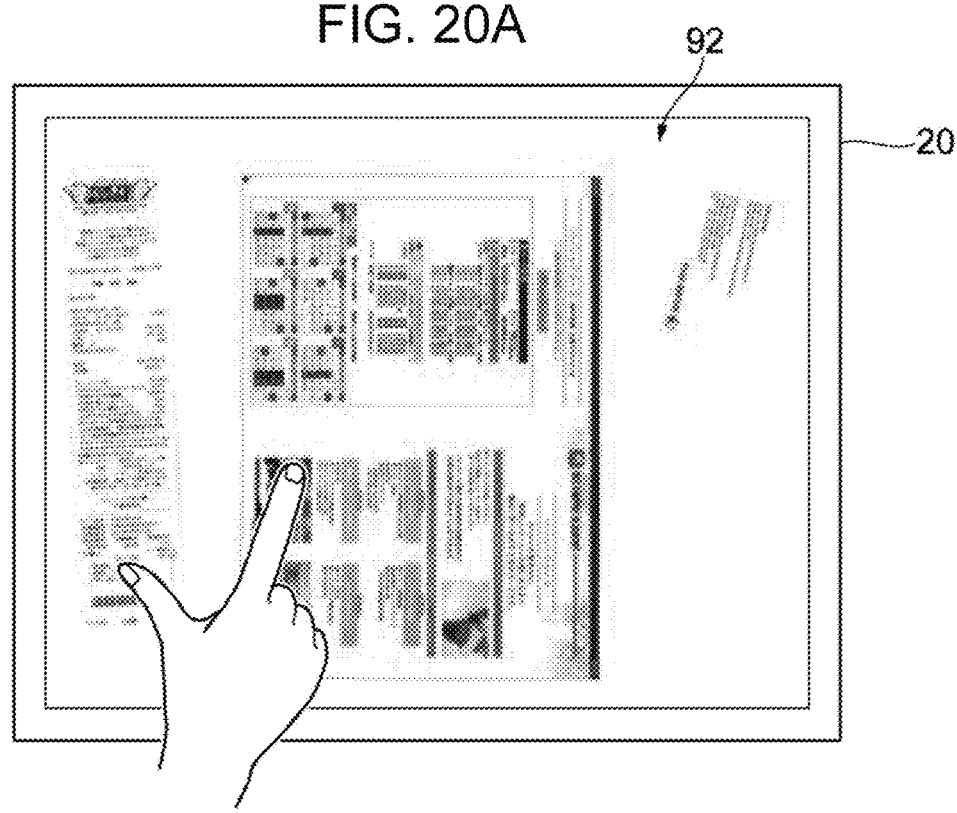
FIGS. 20A and 20B are views each illustrating a screen display example displayed in scan data processing performed after scan image display processing.
Figure 20B:
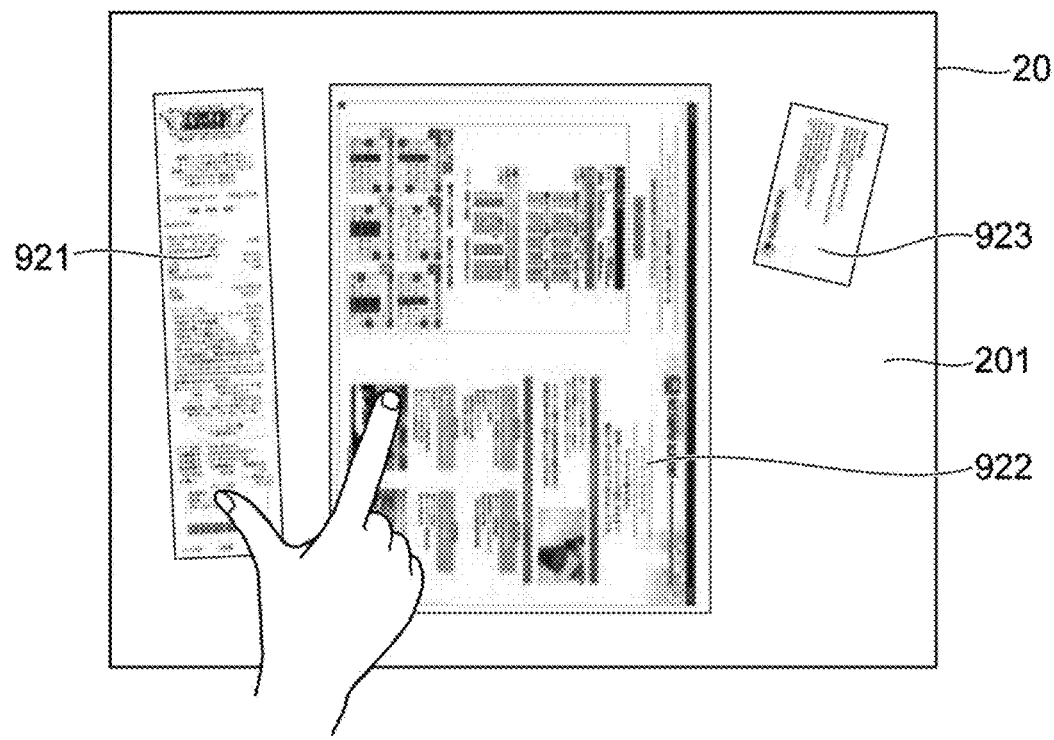

FIGS. 20A and 20B are views each illustrating a screen display example displayed in scan data processing performed optionally after the scan image display processing in step 745 of FIG. 17. As illustrated in FIG. 10, when the receipt 951, the A4 paper 952, and the business card 953 are scanned with placed closely to each other, as illustrated in FIG. 20A, the image processing apparatus 100 displays the scanned image 92 of a document integrating the receipt, the A4 paper, and the business card on the operation stand 20. At this point, the image processing apparatus 100 also performs processing to generate scan data of the document integrating the receipt, the A4 paper, and the business card.

In this state, it is assumed that a user performs a pinch-out operation by touching the receipt portion with the thumb and the A4 paper portion with the index finger on the scanned image 92 as illustrated, and a user performs a pinch-out operation by touching the A4 paper portion with the thumb and the business card portion with the index finger (not illustrated). Then, as illustrated in FIG. 20B, the image processing apparatus 100 divides the scanned image 92 into the scanned image 921 of the receipt, the scanned image 922 of the A4 paper, and the scanned image 923 of the business card. At this point, the image processing apparatus 100 also performs processing to divide the previously generated scan data of the document integrating the receipt, the A4 paper, and the business card into a portion corresponding to the receipt, a portion corresponding to the A4 paper, and a portion corresponding to the business card.

Although not illustrated, it is assumed that a user performs a pinch-in operation by touching the receipt portion with the thumb and the A4 paper portion with the index finger on the scanned images 921 to 923 of FIG. 20B, and a user performs a pinch-in operation by touching the A4 paper portion with the thumb and the business card portion with the index finger. Then, the image processing apparatus 100 combines the scanned image 921 of the receipt, the scanned image 922 of the A4 paper, and the scanned image 923 of the business card. Then, the image processing apparatus 100 also performs processing to combine the scan data of the receipt, the scan data of the A4 paper, and the scan data of the business card.

[Operation Example at Time of Scan Data Processing of Control Device]

Figure 21:
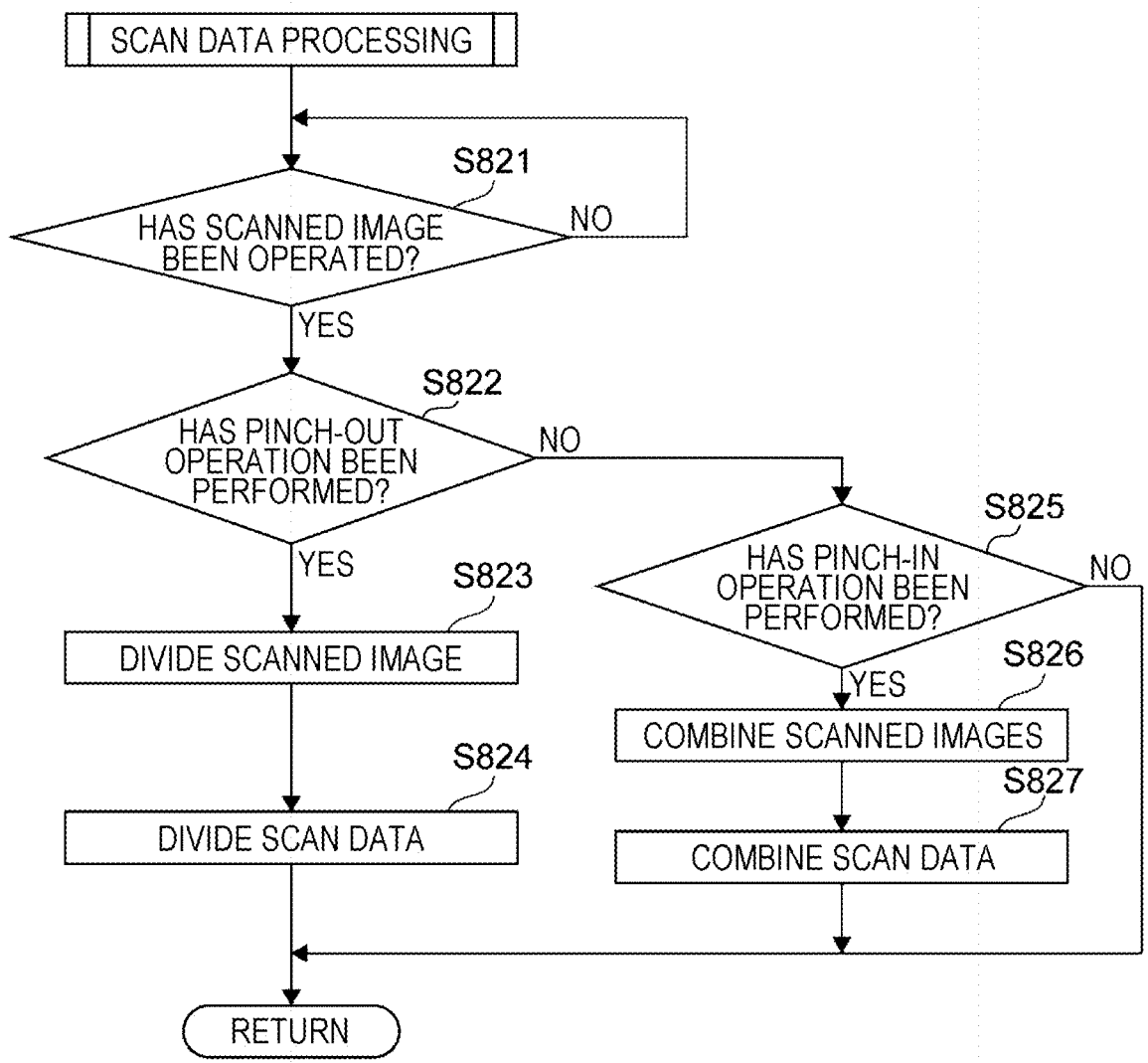
FIG. 21 is a flowchart illustrating an operation example of the control device when scan data processing is performed after scan image display processing.

FIG. 21 is a flowchart illustrating an operation example of the control device 70 when scan data processing is performed after the scan image display processing in step 745 of FIG. 17.

As illustrated, in the control device 70, the detection controller 73 first determines whether or not the operation detector 40 has detected an operation of a user on the scan image 92 (step 821). When it is determined that the operation detector 40 has not detected an operation of a user on the scan image 92, the detection controller 73 repeats step 821.

When it is determined that the operation detector 40 has detected an operation of a user on the scan image 92, the detection controller 73 determines whether or not the operation detector 40 has detected a pinch-out operation on the scan image 92 (step 822). As a result, when it is determined that the operation detector 40 has detected a pinch-out operation on the scan image 92, the projection controller 72 divides and displays the scan image 92 on the operation stand 20 using the projector 30 (step 823). The scan data processor 79 then divides the scan data obtained by the imager 60 (step 824).

Also, when it is determined that the operation detector 40 has not detected a pinch-out operation on the scan image 92, the detection controller 73 determines whether or not the operation detector 40 has detected a pinch-in operation on the scan image 92 (step 825). When it is determined that the operation detector 40 has detected a pinch-in operation on the scan image 92, the projection controller 72 combines the divided scan image 92 and displays the combined scan image 92 on the operation stand 20 using the projector 30 (step 826). The scan data processor 79 then combines the divided scan data obtained by the imager 60 (step 827). On the other hand, when it is determined that the operation detector 40 has not detected a pinch-in operation on the scan image 92, the detection controller 73 returns the processing immediately before step 746.

[Screen Display Example at Time of Overlapping Scan Processing of Image Processing Apparatus]

Figure 22A:
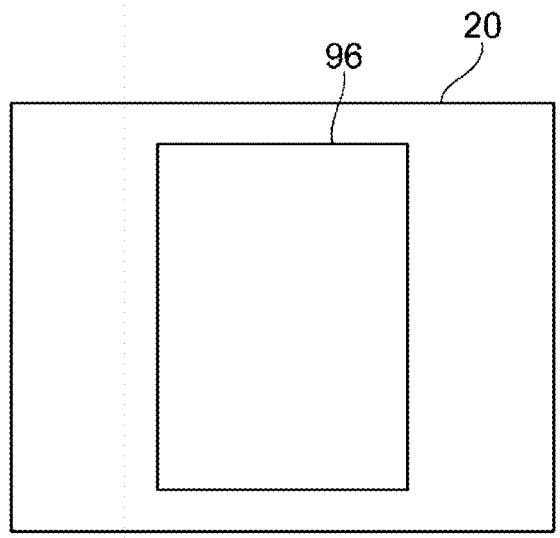
FIGS. 22A to 22D are views illustrating screen display examples displayed in scan image display processing, and subsequent overlapping scan processing.
Figure 22B:
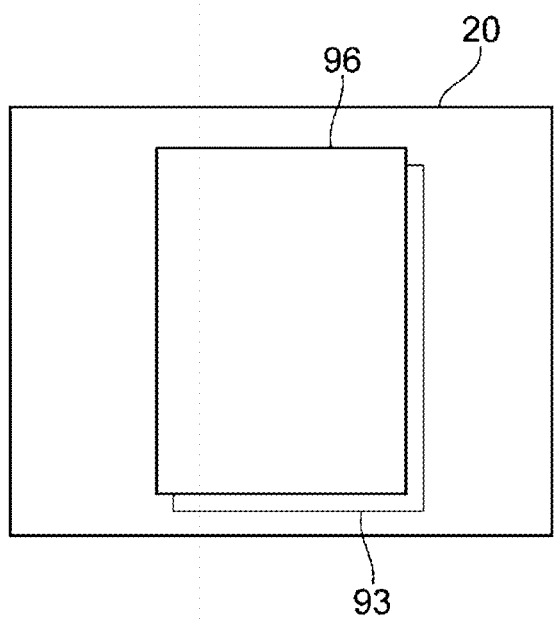

FIGS. 22A to 22D are views illustrating screen display examples displayed in the scan image display processing in step 745 of FIG. 17, and subsequent overlapping scan processing performed optionally. Here, as illustrated in FIG. 22A, it is assumed that a receipt attachment base sheet (hereinafter simply referred to as a "base sheet") 96 placed on the operation stand 20 is scanned as the document 95. Then, as illustrated in FIG. 22B, the image processing apparatus 100 displays the partial scan image 93 at a position shifted in a lower right direction from the base sheet 96.

Figure 22C:
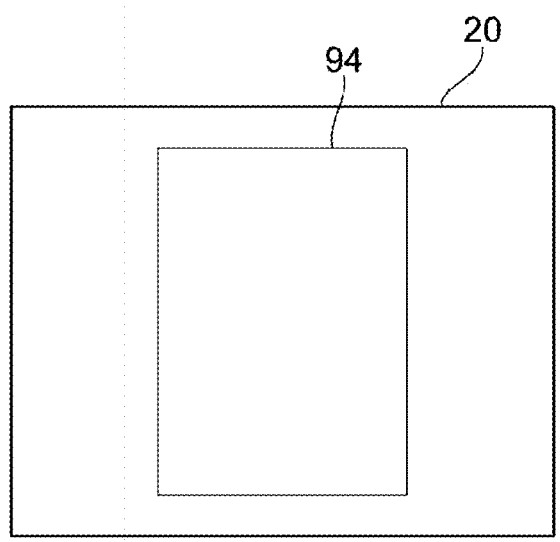
Figure 22D:
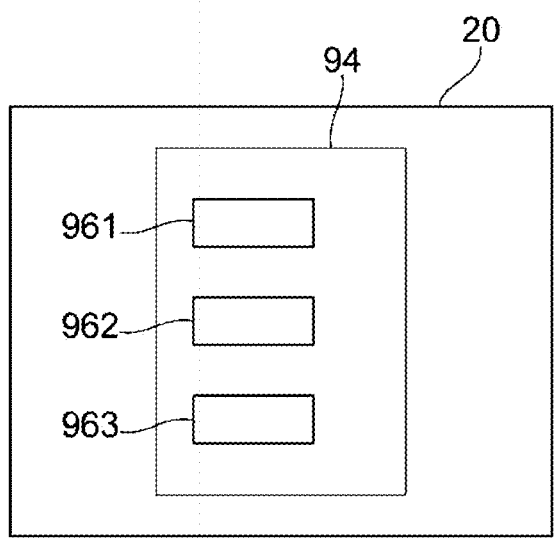

Subsequently, when the base sheet 96 is removed by a user, the image processing apparatus 100 displays the scan image 94 of the entire base sheet as illustrated in FIG. 22C. At this point, the image processing apparatus 100 also generates the scan data of the base sheet. Subsequently, it is assumed that receipts 961 to 963 are placed as the document 95 by a user on the operation stand 20 as illustrated in FIG. 22D, and are scanned in this state. Then, the image processing apparatus 100 generates scan data which integrates the base sheet and three receipts.

Subsequently, when the receipts 961 to 963 are removed and a continuation button (not illustrated) is pressed down by a user, the scan image 94 of the base sheet of FIG. 22C is displayed again. When receipts are scanned afterward, the state of FIG. 22D and the state of FIG. 22C are repeated. However, when the receipts 961 to 963 are removed and a completion button (not illustrated) is pressed down by a user in the state of FIG. 22D, scan data integrating the base sheets and receipts generated so far is stored.

Here, as the image of the base sheet, the scan image 92 obtained by scanning the base sheet 96 is displayed on the operation table 20. However, without being limited to this, for instance, an image of a base sheet may be generated and stored beforehand in a memory area, and the image of the base sheet may be read from the memory area and be displayed on the operation stand 20.

Hereinafter an example of a system will be described, which displays a base sheet image generated beforehand in this manner. When a user logs into the image processing apparatus 100, for instance, by placing the mobile information terminal 90 on the operation stand 20, if notification that a procedure of submitting receipts is necessary for the user is received from a core system, the image processing apparatus 100 displays a receipt scan button (not illustrated). Thus, when the receipt scan button is pressed down by a user, the image processing apparatus 100 displays a settlement item selection screen (not illustrated). When a target settlement item is selected by a user, as illustrated in FIG. 22C, the image processing apparatus 100 reads a base sheet image according to the target settlement item and displays the base sheet image on the operation stand 20. Afterward, scan is performed with the receipts 961 to 963 placed on the operation stand 20 as illustrated in FIG. 22D, and thus the image processing apparatus 100 generates scan data integrating the base sheet and the receipts. When receipts are scanned afterward, the state of FIG. 22D and the state of FIG. 22C are repeated.

In FIG. 22D, scan data integrating the base sheet and three receipts is generated by scanning the entire image of the base sheet on which the receipts 961 to 963 are placed. However, without being limited to this, scan data integrating the base sheet and three receipts may be generated by using a base sheet image and scan data of the receipts obtained by scanning the receipts 961 to 963. In this case, the scan data of the receipts is an example of a first image, the image of the base sheet is an example of a second image, and the scan data integrating the base sheet and three receipts is an example of a third image.

[Operation Example at Time of Overlapping Scan Processing of Image Processing Apparatus]

Figure 23:
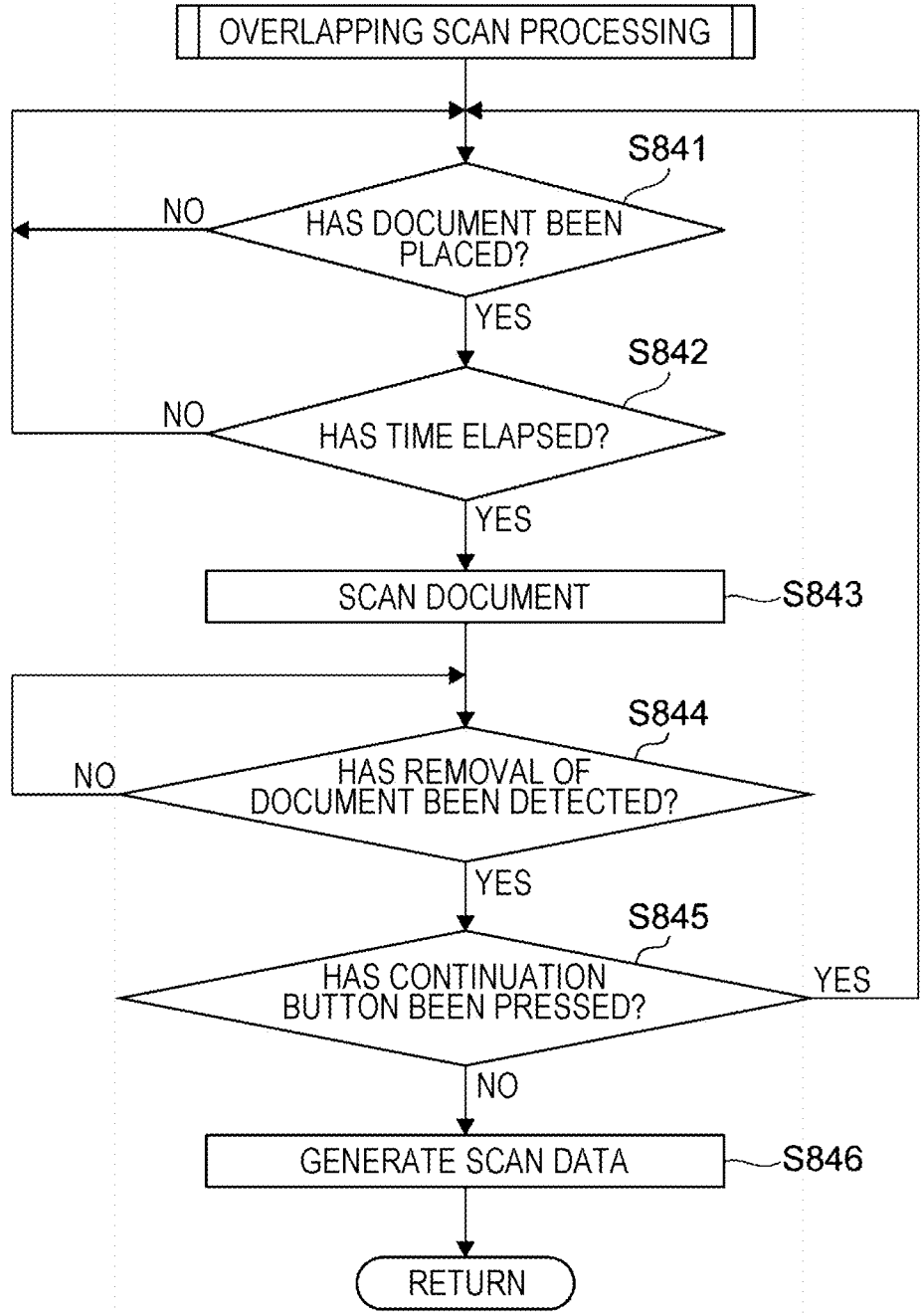
FIG. 23 is a flowchart illustrating an operation example of the control device when overlapping scan processing is performed after scan image display processing.

FIG. 23 is a flowchart illustrating an operation example of the control device 70 when overlapping scan processing is performed after the scan image display processing in step 745 of FIG. 17. Here, it is assumed that the scanned image 94 of a base sheet or a base sheet image generated beforehand is displayed on the operation stand 20 before the operation. Hereinafter the document 95 refers to a target to be scanned placed on a base sheet image (for instance, the receipts 961 to 963 in FIG. 22D).

As illustrated, in the control device 70, the imaging controller 75 first determines whether or not the imager 60 has detected that the document 95 has been placed on the base sheet image displayed on the operation stand 20 (step 841). When it is determined that the imager 60 has not detected that the document 95 has been placed, the imaging controller 75 repeats step 841, whereas when it is determined that the imager 60 has detected that the document 95 has been placed, the imaging controller 75 determines whether or not a predetermined time has elapsed (step 842). When it is determined that a predetermined time has not elapsed, the imaging controller 75 returns the processing to step 841.

When it is determined that a predetermined time has elapsed, the imaging controller 75 scans a base sheet image displayed on the operation stand 20 and the document 95 placed on the base sheet image (step 843).

Subsequently, the imaging controller 75 determines whether or not the imager 60 has detected removal of the document 95 from the operation stand 20 by a user (step 844). When it is determined that the imager 60 has not detected removal of the document 95 from the operation stand 20 by a user, the imaging controller 75 repeats step 844, whereas when it is determined that the imager 60 has detected removal of the document 95 from the operation stand 20 by a user, the detection controller 73 determines whether or not the operation detector 40 has detected pressing down of the continuation button on the operation stand 20 (step 845). When it is determined that the operation detector 40 has detected pressing down of the continuation button on the operation stand 20, the detection controller 73 returns the processing to step 841.

When it is determined that the operation detector 40 has not detected pressing down of the continuation button on the operation stand 20, in other words, when it is determined that the operation detector 40 has detected pressing down of the completion button on the operation stand 20, the scan data processor 79 generates scan data by combining the base sheet image obtained from the imager 60 by the scanning so far, and a result of scanning documents on the base sheet image (step 846).

[Program]

The processing performed by the control device 70 in the exemplary embodiment is prepared, for instance, as a program such as application software.

Specifically, any program that implements the exemplary embodiment is considered to be a program that causes a computer to implement a function of reading the image of a document placed on a platen for placing documents, and a function of displaying part of the read image of the document in a range adjacent to the range, in which the document is placed, of the platen.

Also, any program that implements the exemplary embodiment is considered to be a program that causes a computer to implement a function of reading the image of a document placed on a platen for placing documents, and a function of displaying the read image of the document in a range which has an overlapping area with the range in which the document has been placed or is placed on the platen.

Furthermore, any program that implements the exemplary embodiment is considered to be a program that causes a computer to implement a function of displaying an image on a platen for placing documents, a function of reading at least a first image with a second image displayed on the platen, the first image being the image of the first document placed on the platen, and a function of outputting a third image that integrates the read first image and the second image.

It is to be noted that any program that implements the exemplary embodiment may be provided not only by a communication unit, but also by a recording medium such as a CD-ROM that stores the program.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   a reading unit that reads an image of a document placed on a platen for placing documents; and
   a display unit that displays the image of the document read by the reading unit to overlap the document by displaying the image of the document in a first area which overlaps with a second area on which the document has been placed or is placed on the platen and is displaced from the document within a range; and
   a processor coupled to the reading unit and the display unit and configured to control the display unit to display the image of the document after the document has been detected to have been placed or is placed on the platen wherein the display unit displays an additional image to be added to the image, on the document placed on the platen to indicate that the image of the document has been read by the reading unit.

2. The image reading apparatus according to claim 1, wherein in response to an operation to the image of the document read by the reading unit, the display unit displays an image, which is obtained by processing the image of the document, on the platen.

3. The image reading apparatus according to claim 1, wherein the display unit displays the image of the document read by the reading unit by radiating light from a side, on which the document has been placed, of the platen to the platen.

4. The image reading apparatus according to claim 3, wherein in response to an operation to remove the document from the platen, the display unit displays the image of the document read by the reading unit, on the platen.

5. The image reading apparatus according to claim 1, wherein the display unit displays the image of the document read by the reading unit by radiating light from the platen to a side, on which the document is placed, of the platen.

6. The image reading apparatus according to claim 5, wherein the display unit displays an image having an effect recognizable from above the document in the range, in which the document is placed, of the platen to indicate that the image of the document has been read by the reading unit.

* * * * *